United States Patent
Kodama

(10) Patent No.: US 9,258,457 B2
(45) Date of Patent: Feb. 9, 2016

(54) GAMMA CORRECTION TABLE GENERATION METHOD OR IMAGE PROCESSING METHOD USING GAMMA CORRECTION TABLE AND CONTROL METHOD THEREOF

(71) Applicant: CANON KABUSHIKI KAISHA, Tokyo (JP)

(72) Inventor: Shigeo Kodama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/088,836

(22) Filed: Nov. 25, 2013

(65) Prior Publication Data

US 2014/0146367 A1    May 29, 2014

(30) Foreign Application Priority Data

Nov. 29, 2012  (JP) ................ 2012-261311

(51) Int. Cl.
| | |
|---|---|
| *G06K 15/00* | (2006.01) |
| *H04N 1/40* | (2006.01) |
| *H04N 1/405* | (2006.01) |
| *H04N 1/407* | (2006.01) |

(52) U.S. Cl.
CPC ............. *H04N 1/405* (2013.01); *H04N 1/4078* (2013.01)

(58) Field of Classification Search
USPC ................ 358/3.06–3.26, 3.02, 518
See application file for complete search history.

(56) References Cited

U.S. PATENT DOCUMENTS 5,854,882 A  *  12/1998  Wang ................ 358/1.9

FOREIGN PATENT DOCUMENTS

JP      2005-341249 A    12/2008

\* cited by examiner

*Primary Examiner* — Barbara Reinier
(74) *Attorney, Agent, or Firm* — Canon USA Inc. IP Division

(57) ABSTRACT

A gamma correction table generation method includes: obtaining density information by reading, with a reading sensor, a density patch output by an image forming device in a range wider than a cell, the density patch including a plurality of cells disposed such that a part of the cells as a unit representing a tone overlaps with each other and dots included in each of the cells are separated from each other to an extent that no influence is exerted on each other on a recording medium which the image forming device outputs; correcting the density information according to a number of the cells in the density patch; and generating a gamma correction table based on the corrected density information.

12 Claims, 24 Drawing Sheets

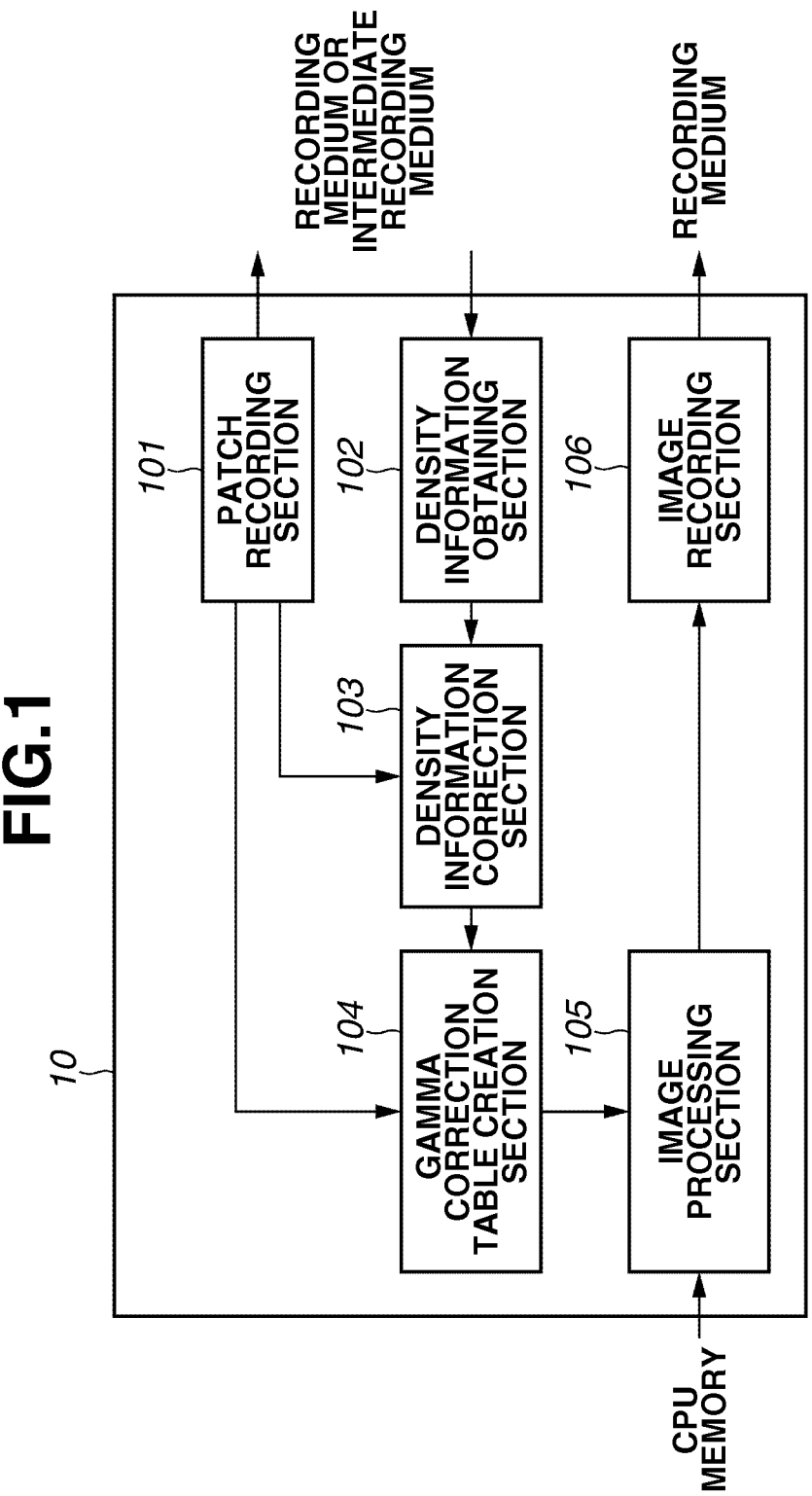

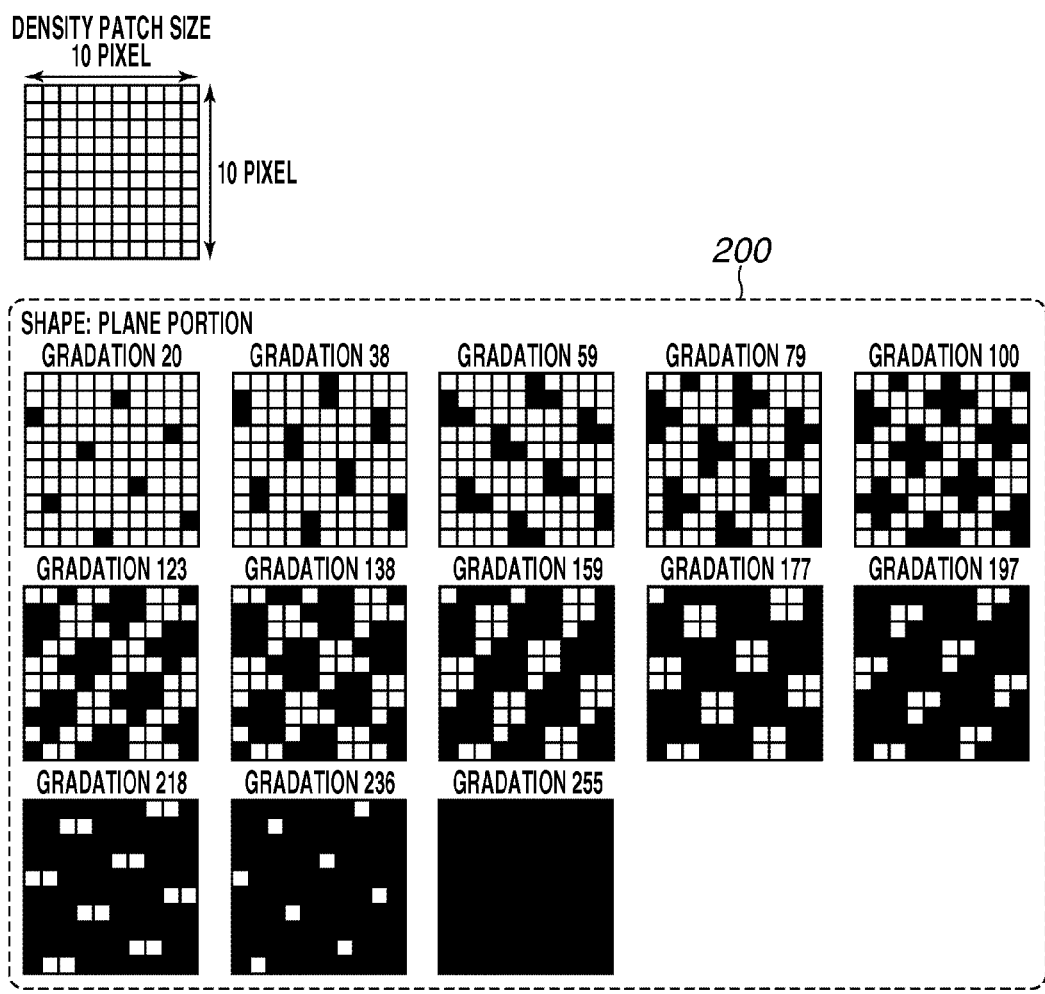

FIG.2B
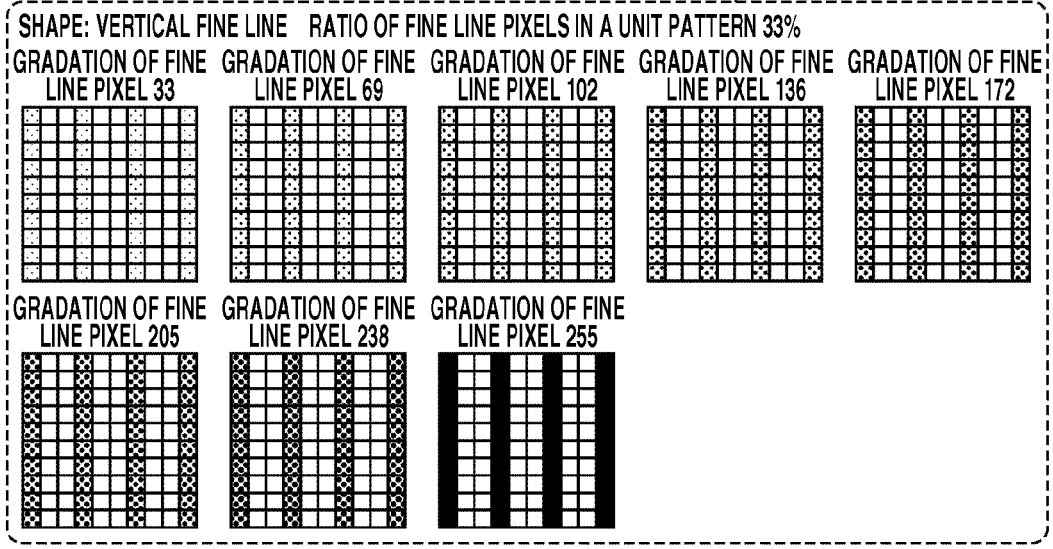
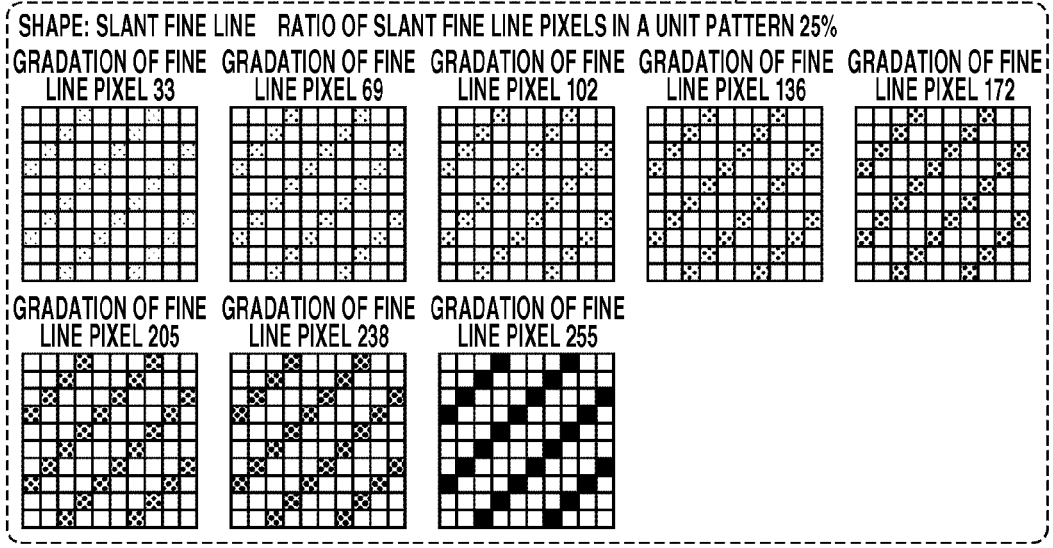

DENSITY SENSOR
MEASUREMENT RANGE

FIG.6
☐ GRADATION VALUE 0 PIXEL
■ GRADATION VALUE NON-0 PIXEL
VERTICAL FINE LINE PATTERN
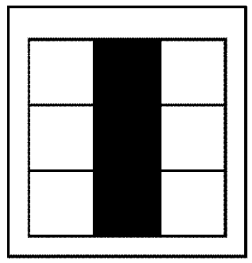
HORIZONTAL FINE LINE PATTERN
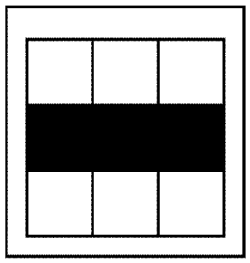
SLANT FINE LINE PATTERN
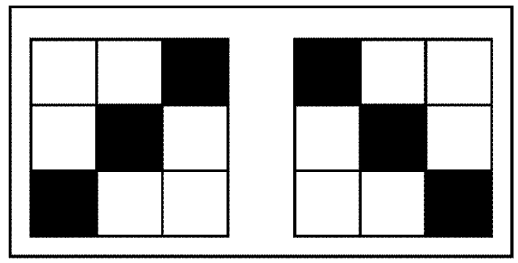
OTHER FINE LINE PATTERN
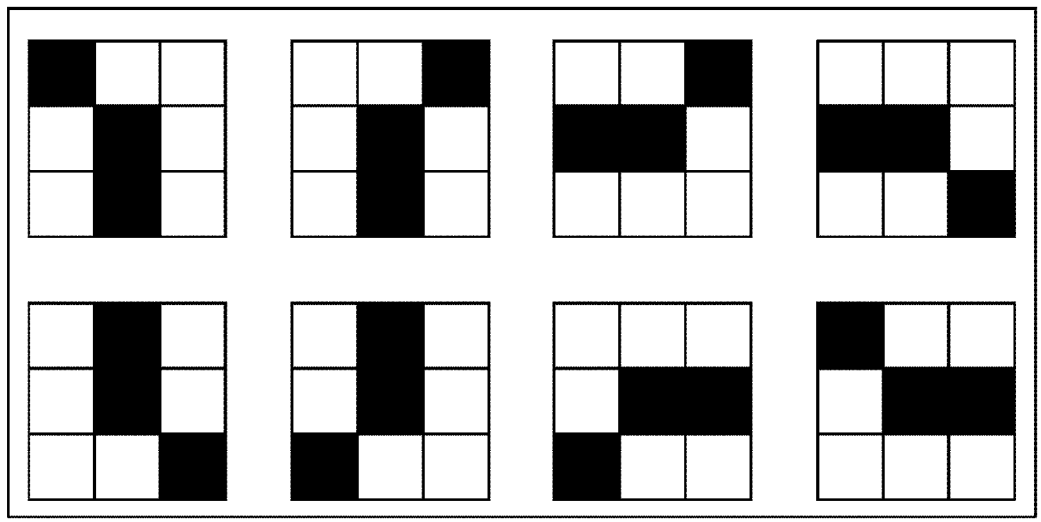

- TH[n] = X * 20 + 1.25 + n * 2.5
  (X: INDEX NUMBER, N = 0 - 7)

FIG.11
DENSITY
PATCH SIZE
3 PIXEL
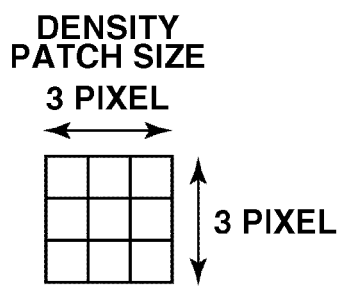
3 PIXEL
SHAPE: ISOLATED POINT     ISOLATED POINT DENSITY PATCH GROUP 203
GRADATION 33
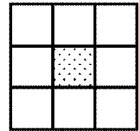
GRADATION 69
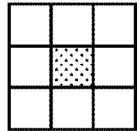
GRADATION 102
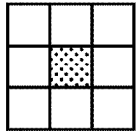
GRADATION 135
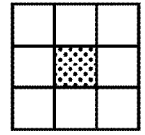
GRADATION 171
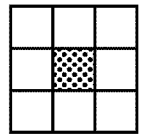
GRADATION 204
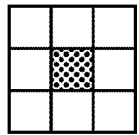
GRADATION 237
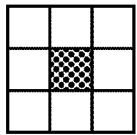
GRADATION 255
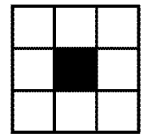

DENSITY SENSOR
MEASUREMENT RANGE

GAMMA CORRECTION TABLE GENERATION METHOD OR IMAGE PROCESSING METHOD USING GAMMA CORRECTION TABLE AND CONTROL METHOD THEREOF

BACKGROUND OF THE INVENTION

1. Field of the Invention

The present disclosure generally relates to gamma correction and, more particularly, to a method of creating a gamma correction table for forming an image on a recording medium based on digital image data or an image processing method using a gamma correction table.

2. Description of the Related Art

In image forming devices for forming images on a recording medium based on a digital image data, each of the image forming devices has a different output density characteristic. Therefore, when forming an image on a recording medium based on the same digital image data, the density output on the recording medium may be sometimes different. In order to output a desired digital image data on a recording medium, each of the image forming devices generally corrects the digital image data according to the characteristic of each image forming device. This is well-known as gamma correction.

Also, in many cases, the tone number available per pixel in an image forming device such as a printer is smaller than the tone number of a digital image data handled in a personal computer or the like. Therefore, the digital image data is subjected to low tone processing to convert the tone number of the digital image data into a tone number which the image forming device can output. Among low tone processing, the screen processing generally converts input digital image data into image data that represents the tone in a quasi-manner in a certain area.

On the other hand, when performing the screen processing on the image data, the resolution may sometimes degrade. In particular, it is known that, in an image drawn with characters and/or lines, the characters and/or lines may generate a discontinuation, resulting in a considerable detone of the image quality. Japanese Patent Application Laid-Open No. 2005-341249 discusses a method in which a contour portion of an image is detected and the detected image is subjected to an enhancing or reducing processing, and subsequently the image is subjected to a continuous tone processing before being output. Pixels which are not in the contour portion are output after being subjected to the screen processing. According to the Japanese Patent Application Laid-Open No. 2005-341249, a contour portion and an area other than the contour portion are subjected to a different gamma correction.

A gamma correction table used for gamma correction is generated based on the characteristic of the output density, which is obtained by measurement of the actual density recorded on a recording medium, with use of a sensor.

However, conventional methods have a problem that it is difficult to obtain a precise characteristic of the output density. In the method discussed in the Japanese Patent Application Laid-Open No. 2005-341249, the tone on a contour portion is represented by a single pixel. On the other hand, in a portion other than the contour portion, an area including a plurality of pixels represents the tone in a quasi-manner. Therefore, a plurality of gamma correction tables appropriate to the respective areas has to be generated. However, in the conventional methods, appropriate gamma correction table is hardly generated.

According to the Japanese Patent Application Laid-Open No. 2005-341249, since dot gain and bleeding of ink have to be considered, the output density in a contour portion corresponding to a pixel of interest is measured using a sensor having the resolution lower than the resolution of input image data. However, it is likely that different output densities corresponding to the respective input tone values appear in a mixed state around the pixel of interest forming the contour portion. Therefore, since it is impossible to relate the output densities measured by a sensor to the input tone values in a one-to-one relationship, it is impossible to obtain an appropriate characteristic of the output density. As a result, it is difficult to generate a gamma correction table. Thus, it is occasionally necessary to correct the measurement of the output density to calculate the characteristic of the output density based on a measurement result of the output density recorded on a recording medium measured by a sensor of an image forming device.

SUMMARY OF THE INVENTION

Accordingly, the present disclosure is directed to an image processing method for creating a precise gamma correction table by appropriately correcting a measurement result of an output density on a recording medium measured by a sensor.

According to an aspect of the present disclosure, a gamma correction table generation method includes: obtaining density information by reading, with a reading sensor, a density patch output by an image forming device in a range wider than a cell, the density patch including a plurality of cells disposed such that a part of the cells as a unit representing a tone overlaps with each other and dots included in each of the cells are separated from each other to an extent that no influence is exerted on each other on a recording medium which the image forming device outputs; correcting the density information according to a number of the cells in the density patch; and generating a gamma correction table based on the corrected density information.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIG. 1 is a block diagram of an image forming device.

FIGS. 2A and 2B illustrate examples of a density patch.

FIG. 6 illustrates fine line detection patterns and detection conditions.

FIG. 11 illustrates an example of an isolated point patch.

DESCRIPTION OF THE EMBODIMENTS

Figure 3:
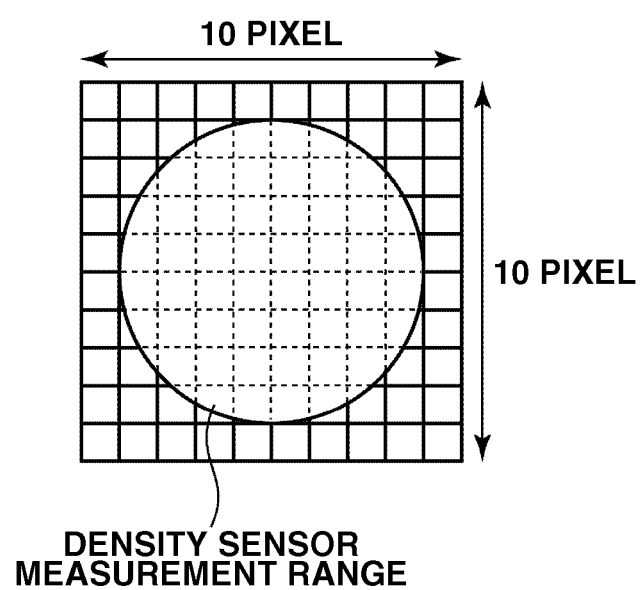
FIG. 3 illustrates a measurement range of a density sensor.

Various exemplary embodiments, features, and aspects of the disclosure will be described in detail below with reference to the drawings.

The following exemplary embodiments are given only as examples. The exemplary embodiments do not limit the scope of the disclosure.

A first exemplary embodiment describes an example of a creating method of a gamma correction table for a plane portion and a fine line. More particularly, a gamma correction table is generated that is capable of appropriately correcting a measurement result of an output density of pixels constituting a fine line and is capable of appropriately performing gamma correction on pixels constituting the fine line.

FIG. 1 is a block diagram illustrating an example of a configuration of an image forming device applicable to the first exemplary embodiment. An image forming device 10 includes a patch recording section 101, a density information obtaining section 102, a density information correction section 103, a gamma correction table generation section 104, an image processing section 105, and an image recording section 106. The image forming device 10 obtains digital data of an input image from a central processing unit (CPU) or a memory connected to the outside via a bus. The image forming device 10 forms image data, in which various processing is made on multi-level image data, on a recording medium. The image forming device 10 also generates a gamma correction table where appropriate according to an instruction from a CPU or given by a user. In the first exemplary embodiment, a description will be made while taking an example of a case where the multi-level image data is 8-bit data (including 256 tones of 0-255).

The patch recording section 101 records a density patch on a recording medium (or on an intermediate recording medium when the correlation with an output density on the recording medium is known). The density patch is recorded to generate a gamma correction table. FIGS. 2A and 2B illustrate examples of density patches recorded by the patch recording section 101. The size of each density patch according to the first exemplary embodiment is 10 pixels×10 pixels. Each of the density patches is previously determined according to the low tone processing performed by the image processing section 105. According to the first exemplary embodiment, the density patches to be recorded include a plane portion density patch group 200, a vertical fine line density patch group 201, and a slant fine line density patch group 202. Detailed description on each of the density patches will be given later.

The density information obtaining section 102 obtains density information of the density patch on a recording medium or an intermediate recording medium recorded by the patch recording section 101. Herein, a density sensor is used to directly measure an output density on the recording medium and a measurement result is obtained as the density information. The measurement method of the output density can also be achieved by obtaining another kind of information such as a height of toner having a correlation with the density. FIG. 3 illustrates a measurement range of a density sensor used by the density information obtaining section 102 according to the first exemplary embodiment. It is understood that the resolution of the density sensor used in the first exemplary embodiment is lower than the resolution of the image data. That is, the measurement result obtained by the density sensor is approximate to a value of an averaged density of the pixels constituting image data corresponding to the measurement range.

The density information correction section 103 corrects the density information obtained by the density information obtaining section 102. Here, the density information is corrected when the density information is a measurement result obtained by recording the density of the vertical fine line density patch group 201 and the slant fine line density patch group 202. The density information is corrected based on a relationship between the pixel value of each pixel in the density patch and the tone represented by the dot pattern constituting the density patch. Detailed description on the correction method made by the density information correction section 103 will be given later. The density information of the plane portion density patch group 200 is not subjected to the correction.

The gamma correction table generation section 104 generates a gamma correction table based on the characteristic of the output density obtained from the density information or corrected density information. According to the first exemplary embodiment, a gamma correction table for plane portion, a gamma correction table for vertical fine line, and a gamma correction table for slant fine line are generated.

Figure 4:
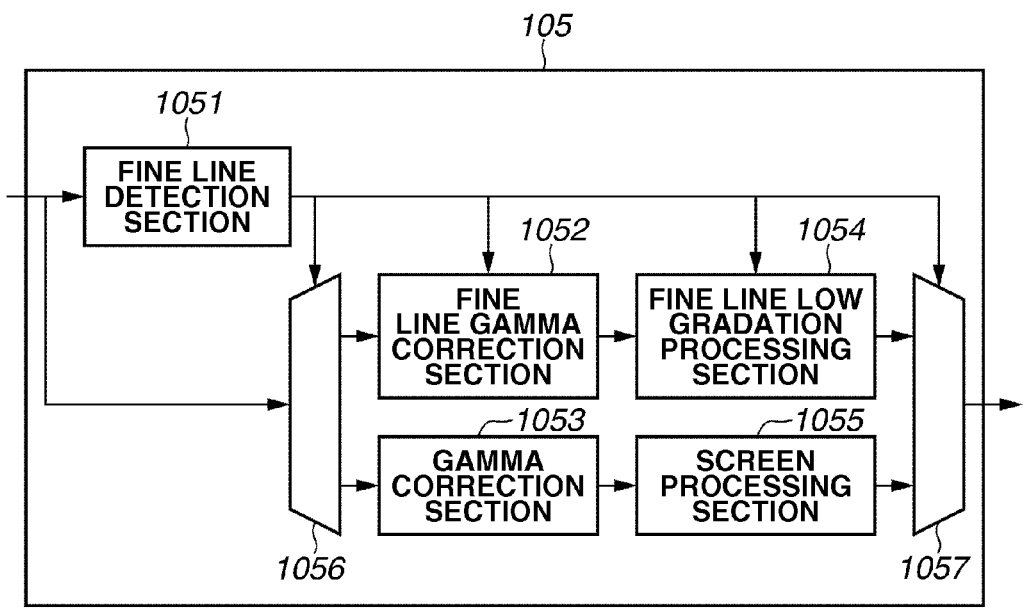
FIG. 4 is a block diagram illustrating a detailed image processing section.

The image processing section 105 performs an image processing on multi-level image data transmitted from the CPU or the memory. FIG. 4 illustrates a detailed block diagram of the image processing section 105 according to the first exemplary embodiment. The image processing section 105 includes a fine line detection section 1051, a fine line gamma correction section 1052, a gamma correction section 1053, a fine line low gradation processing section 1054, a screen processing section 1055, and selectors 1056 and 1057.

The fine line detection section 1051 checks each of the pixels and performs a pattern matching to determine whether the pixel is the pixel constituting a fine line.

The fine line gamma correction section 1052 performs a gamma correction on a pixel (hereinafter referred to as pixel of fine line) which is detected as a fine line by the fine line detection section 1051. The fine line gamma correction section 1052 uses either one or both of a gamma correction table for vertical fine line and a gamma correction table for slant fine line generated by the gamma correction table generation section 104.

The gamma correction section 1053 performs a gamma correction on a pixel (hereinafter referred to as flat pixel) in a plane portion, which is output from the fine line gamma correction section 1052 and is not detected as a fine line by the fine line detection section 1051. The gamma correction section 1053 uses the gamma correction table for plane portion generated by the gamma correction table generation section 104.

The fine line low gradation processing section 1054 performs a low tone processing on a pixel value of a pixel of fine line output from the fine line gamma correction section 1052. The fine line low gradation processing section 1054 performs the low tone processing to reduce the tone number of a pixel value representing a pixel of fine line according to the tone number per pixel, which the image recording section 106 can output. The image data input into the image processing section 105 is 8-bit data representing 256 tones. The fine line low gradation processing section 1054 performs a 9-valuation processing to convert a pixel value having 256 tones into 9 tones.

The screen processing section 1055 performs a screen processing on a pixel value of a flat pixel output from the gamma correction section 1053. Here, the conversion of the tone number is made by a dither method using a threshold matrix. The screen processing section 1055 performs the processing for converting the pixel value of 256 tones into 9 values.

The selector 1056 sorts the image data for each pixel according to the detection result made by the fine line detection section 1051. When a pixel to be processed is detected as a fine line, the pixel value of each pixel is output to the fine line gamma correction section 1052. When any pixel to be processed is not detected as a fine line, the pixel value of each pixel is output to a gamma correction section 1053. Likewise, the selector 1057 selects a result obtained by the fine line low gradation processing section 1054 as for a pixel detected as a fine line, and selects a result obtained by the screen processing section 1055 as for a pixel not detected as a fine line, as an output value respectively. The selector 1057 gives output image data.

The image recording section 106 records the output image data processed by the image processing section 105 on a recording medium. The image recording section 106 may be either an electrophotographic system or an inkjet system.

(Image Processing and Image Recording Operation)

Figure 5A:
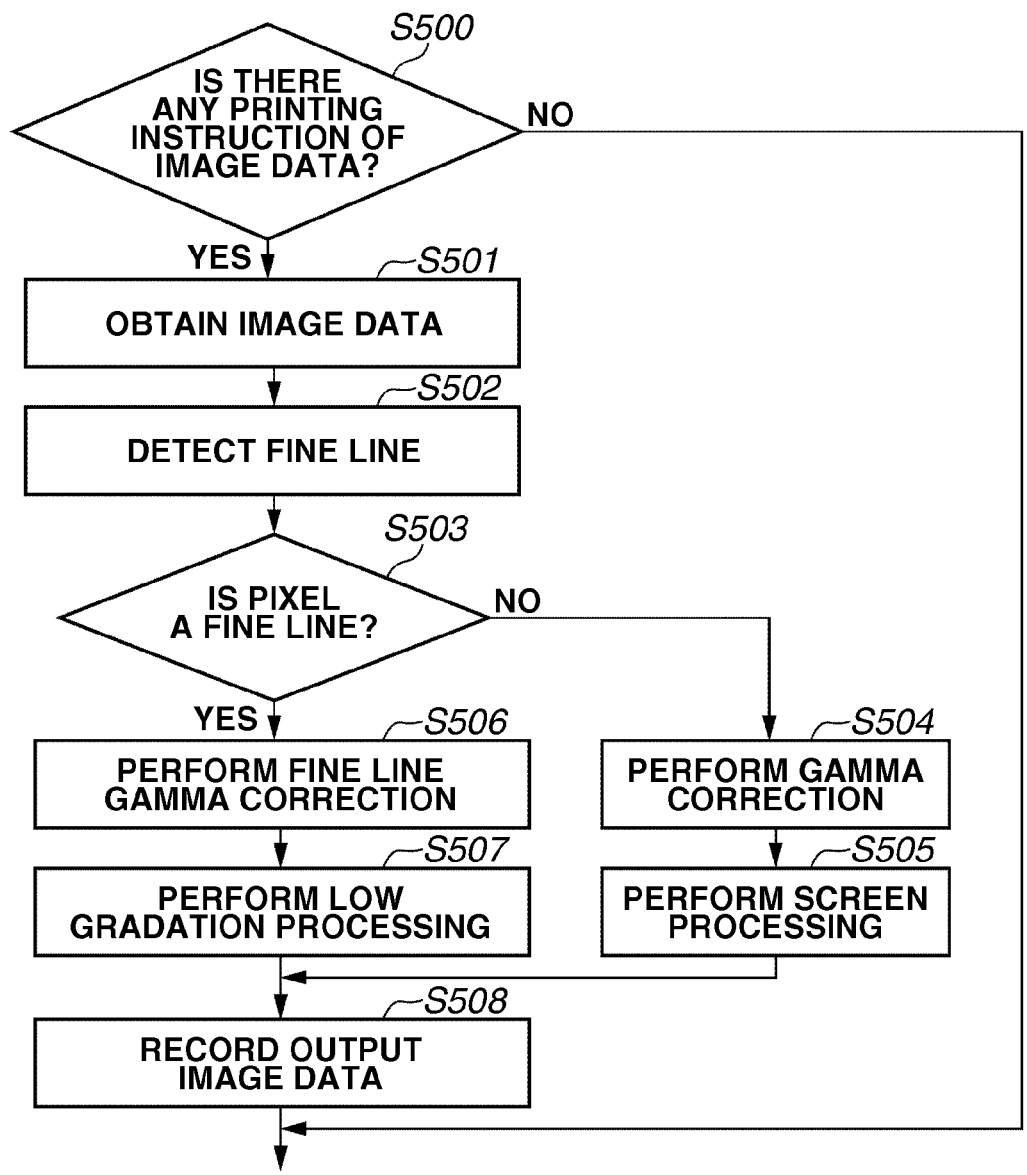
FIGS. 5A and 5B are flowcharts of image processing and image recording in the image forming device.

The operation of the image forming device to record an image according to the first exemplary embodiment will be described below. FIG. 5A is a flowchart when the image recording section 106 records an image.

In step S500, the image forming device 10 determines whether any instruction to print image data is given from a CPU connected outside the device, or a user. As a determination result, when a printing instruction is detected (YES in step S500), the process proceeds to step S501.

In step S501, the image forming device 10 obtains input image data to be recorded. The input image data is input from the CPU connected to the outside of the image forming device 10 or a memory.

In step S502, the fine line detection section 1051 performs fine line detection. According to the first exemplary embodiment, the fine line detection section 1051 detects a fine line of a one pixel width by performing a pattern matching. FIG. 6 illustrates patterns of fine lines and detection conditions that the fine line detection section 1051 uses for detecting the fine line. The fine line detection section 1051 detects a vertical fine line, a horizontal fine line, a slant fine line, and other fine lines.

Figure 7A:
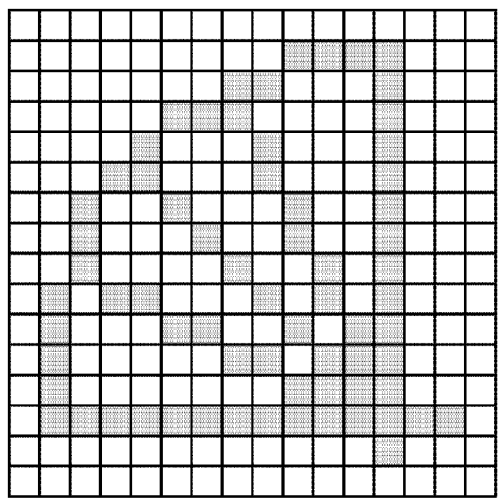
FIGS. 7A-7D illustrate examples of an input image, intermediate images, and an output image.
Figure 7B:
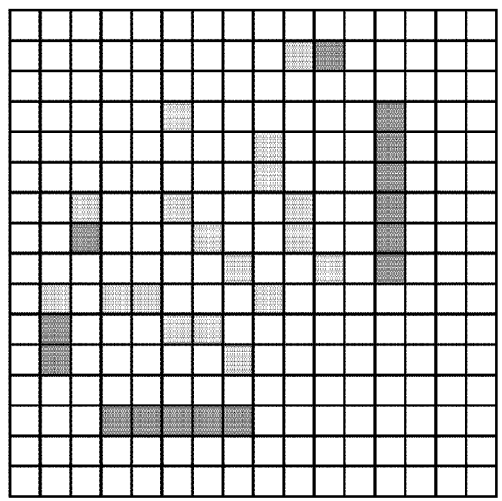

FIG. 7A is an example of an input image data. FIG. 7B illustrates a detection result of fine lines obtained from the input image data. In FIG. 7B, the pixels detected as a vertical fine line and a horizontal fine line are represented with black pixels; the pixels detected as a slant fine line are represented with light gray pixels; the pixels detected as other fine lines are represented with heavy gray pixels; and the pixels other than fine lines are represented with white pixels.

In step S503, the process branches based on the fine line detection result in step S502. When the pixel to be processed is not a pixel of fine line (NO in step S503), the process proceeds to step S504, and when the pixel to be processed is a pixel of fine line (YES in step S503), the process proceeds to step S506. For example, in the case of the fine line detection result illustrated in FIG. 7B, since white pixels are not detected as pixels of fine line, the process proceeds to step S504. On the other hand, when the pixels are other than white pixels, since the pixels are detected as pixels of fine line, the process proceeds to step S506. According to the first exemplary embodiment, the image processing section 105 performs switching between the processing on the pixels of fine lines and the processing on the pixels other than fine lines. However, the image processing section 105 may be configured to perform both of the processing on the pixels of fine line and the processing on the pixels for other than fine lines and to select processing results based on the fine line detection result.

In step S504, the gamma correction section 1053 performs a gamma correction on flat pixels in the pixels constituting the input image data. According to the first exemplary embodiment, the gamma correction section 1053 performs a gamma correction by using a gamma correction table, which is generated using the plane portion density patch group 200.

Figures 8A, 8B:
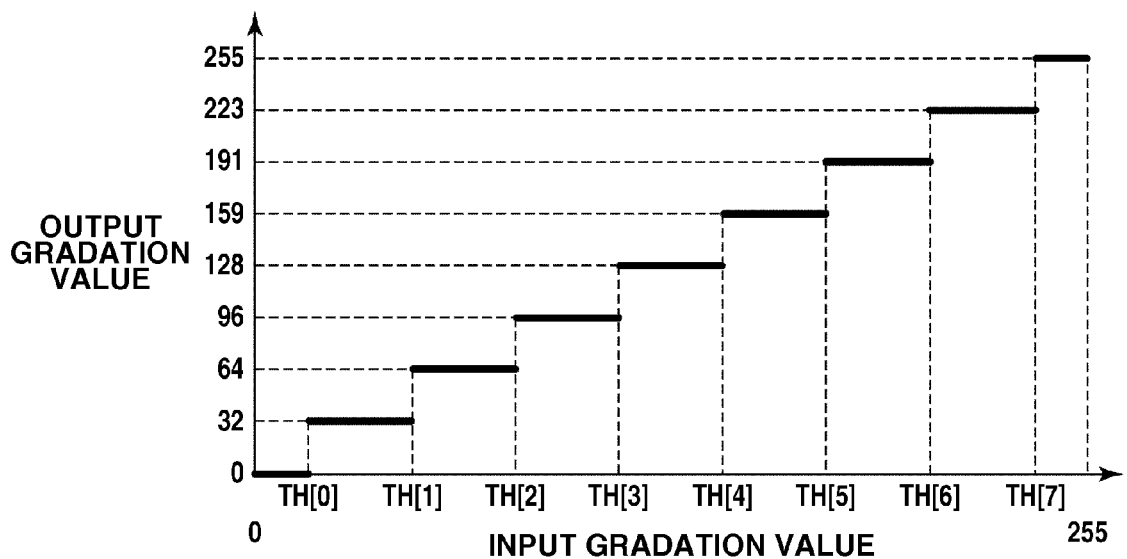
FIGS. 8A and 8B illustrate screen processing.

In step S505, the screen processing section 1055 performs a screen processing using a dither method. FIGS. 8A and 8B illustrate a dither method that the screen processing section 1055 performs. Each of the cells corresponding to the pixel groups stores a different index number. As illustrated in FIG. 8A, the cells corresponding to the image data are periodically arranged without any space and each of the pixels is associated with any of index numbers. Each of the index numbers corresponds to a threshold value having a different level respectively as illustrated in FIG. 8B. The screen processing section 1055 makes a comparison between the pixel value of each of the pixels constituting the input image data of 256 tones and the threshold value corresponding to the index number, to determine the output value of each pixel as any of 9 tones. The threshold value TH[n] is calculated using the formula shown below:

$$TH[n]=X*20+1.25+n*2.5$$

(X: index number).

The processing result using the above dither method can express a quasi tone in a unit cell. Generally, in the dither method, (a tone number which the cell can express in a quasi manner)=(number of pixels in the cell)×(output tone number in the cell−1)+1. That is, in the example of the first exemplary embodiment, as a result of screen processing by the screen processing section 1055, 105 tones can be expressed in a quasi manner.

Figure 7C:
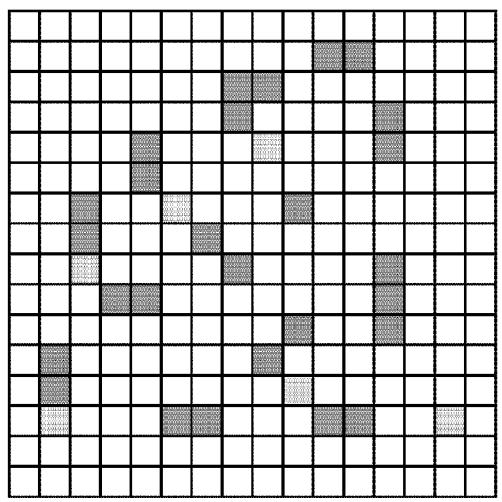

FIG. 7C illustrates a result of the screen processing made by the screen processing section 1055 on the input image data illustrated in FIG. 7A. In FIG. 7C, the processing is performed on all pixels constituting the input image data illustrated in FIG. 7A. According to the first exemplary embodiment, the processing is practically performed only on the white pixels in the detection result illustrated in FIG. 7B.

In step S506, the fine line gamma correction section 1052 performs a fine line gamma correction on the pixels of the fine line. The fine line gamma correction section 1052 performs the gamma correction on every fine line detected in step S502 using a vertical fine line gamma correction table and a slant fine line gamma correction table. The gamma correction is performed using a dedicated gamma correction table on the pixels, which are determined as included in a vertical fine line or a slant fine line as a result of fine line detection in step S502. When a horizontal fine line is detected, the fine line gamma correction section 1052 performs a gamma correction using a vertical fine line gamma correction table which has characteristics similar to the output density of the image forming device.

As for other fine lines, it is estimated that the other fine lines have characteristics of the output density which are intermediate density characteristics between the characteristics of the output density of the vertical fine line or the horizontal fine line and the characteristics of the output density of the slant fine line. Therefore, a gamma correction value suitable to the pixel detected as other fine lines can be calculated using the vertical fine line gamma correction table along with the slant fine line gamma correction table.

In step S507, the fine line low gradation processing section 1054 performs a low tone processing on the pixels of fine line.

Figure 9:
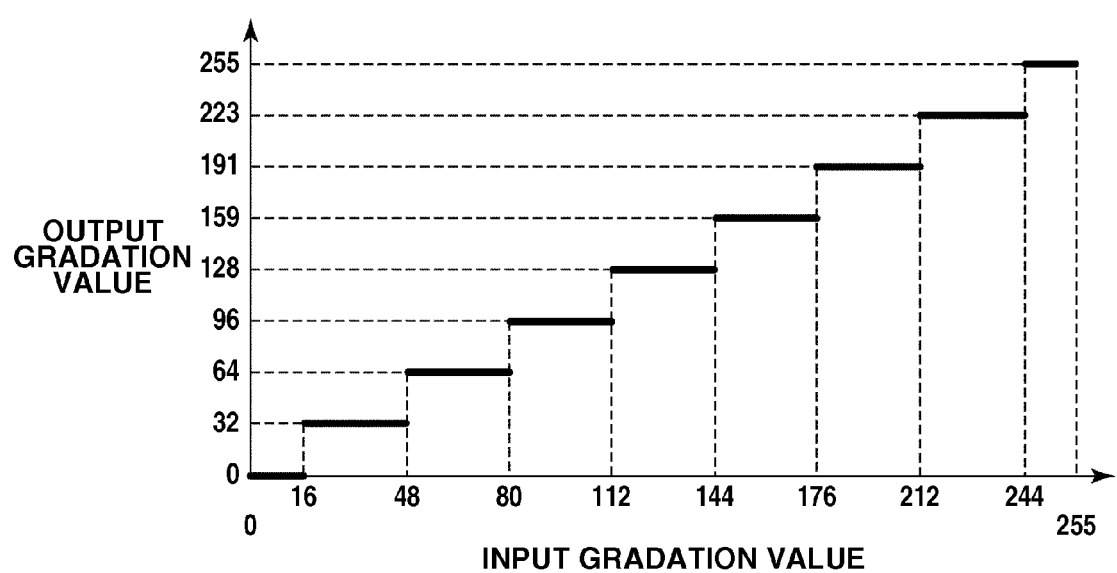
FIG. 9 illustrates a low tone processing for a fine line.

FIG. 9 illustrates a fine line low tone processing. As illustrated in FIG. 9, the fine line low gradation processing section 1054 has eight threshold values for one pixel. The fine line low gradation processing section 1054 compares sequentially the pixel values of the pixels constituting the input image data of 256 tones with the eight threshold values corresponding to the pixel, and outputs any of the 9 tones as an output value. In such low tone processing carried out by the fine line low gradation processing section 1054, the tone number is represented in a pixel unit. Therefore, although the tone is lower than the quasi tone number represented by each cell obtained by the screen processing section 1055, the resolution is maintained.

For human eyes, the resolution tends to have priority over the tone in a region where many high-frequency components are included like fine line. Accordingly, when the fine line low gradation processing section 1054 makes low tone processing, the reduction of the tone in the fine line portion is hardly perceived and a satisfactory low tone image can be obtained while maintaining the resolution. Although the low tone processing on the pixel of fine line is not necessarily processing according to the first exemplary embodiment, it is desirable that the low tone processing is the processing that places emphasis on the resolution rather than a low tone processing which is performed on the pixels in a plane portion.

Figure 7D:
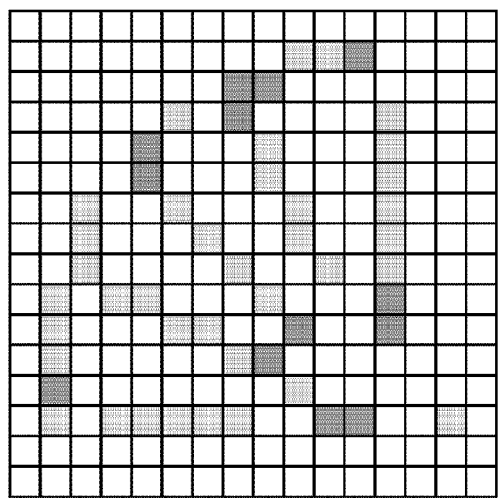

In step S508, the image recording section 106 records output image data on a recording medium. In step S505 or step S507, the tone number of each of the pixels is reduced to a tone number which the image recording section 16 can output. In the first exemplary embodiment, the input pixel data illustrated in FIG. 7A is converted into an output image data illustrated in FIG. 7D through the processing in step S505 and step S507. Since each of the plane portion and the fine line portion have been subjected to an appropriate gamma correction, the image formed on the recording medium becomes an agreeable image in which the density of the plane portion matches up with the density of the fine line.

(Density Patch to be Employed in Creating Gamma Correction Table)

A detailed description will be given below on the density patch which is recorded by the patch recording section 101 to generate a gamma correction table.

FIGS. 2A and 2B illustrate examples of density patches recorded according to the first exemplary embodiment. The patch recording section 101 records density patches of a plane portion density patch group 200, a vertical fine line density patch group 201, and a slant fine line density patch 202.

The plane portion density patch group 200 includes a plurality of density patches for measuring the characteristic of the output density when an input image data representing plane tone including no lines is formed on the recording medium. The plane portion density patch group 200 includes dot patterns that the screen processing section 1055 obtains by performing a screen processing on a plane input image data. In this case, the tone value represented by all pixels are constant.

Here, all pixels in 10 pixels×10 pixels are the density patch which are the result of the screen processing that the image processing section 105 performs on a uniform input image data of an input tone value of 20, 38, 59, 79, 100, 123, 138, 159, 177, 197, 218, 236 and 255. The screen processing will be described below.

In the dot patterns obtained as a result of the screen processing, the ratio of the black pixels to the white pixels in the 100 pixels is, in the above-mentioned order, 8%, 15%, 23%, 31%, 39%, 46%, 54%, 62%, 69%, 77%, 85%, 92% and 100% respectively.

In the plane portion density patch, each of the cells is represented by a quasi tone. In the measurement range illustrated in FIG. 3, the result measured by the sensor is approximate to an average value of each pixel included in the density patch. Therefore, with respect to the characteristic of the output density of the plane portion, the input tone value can be associated with the output density without correcting measurement result obtained by the sensor.

The vertical fine line density patch group 201 includes density patches for measuring the characteristic of the output density when a vertical fine line is formed on a recording medium. It is desirable to measure the characteristic of the output density of one pixel included in a fine line that forms one vertical fine line having a width of one pixel. That is, measurement of the density at which a fine line having a target tone is output is used as the output density corresponding to the target tone.

However, when measuring the output density on the recording medium, it is difficult to measure the output density of a single vertical fine line without including any background (paper white) of the vertical fine line. Also, if the measuring position of the density sensor is displaced a little, the number of pixels of fine line included in the measurement range may change resulting in an alteration of the detected output density.

Therefore, according to the first exemplary embodiment, as illustrated in the vertical fine line density patch group 201, an image in which a plurality of vertical fine lines are periodically arranged is used as the density patch. However, depending on the characteristic of the image forming device, the surrounding recorded dots may have influence on the density of the output dot. Therefore, in any of the density patches of the vertical fine line density patch group 201, the vertical fine lines are arranged being separated from each other to an extent that no influence is exerted on the respective densities.

When the repeated dot patterns are used as a unit pattern, the density patch in the vertical fine line density patch group 201 is 10 pixels in a vertical direction×3 pixels in a horizontal direction. An image of a vertical fine line having black pixels at the left side becomes the unit pattern. By periodically arranging the unit patterns 10 pixels in the vertical direction× 10 pixels in the horizontal direction necessary for the density patch, the output density is increased so that the density sensor can precisely measure even when the measurement position is altered.

The density patches in the vertical fine line density patch group 201 are constituted of pixels of fine line having vertical fine lines of tone 33, 69, 102, 136, 172, 205, 238 and 255. The measurement result of the density recorded on the recording medium measured by the density sensor is approximate to an average value of the density represented by the pixels constituting the image data corresponding to the measurement range. That is, the measurement result of a fine line density patch is approximate to an average value of the pixel values of the pixels included in the unit pattern.

It is desirable to measure the output density of one pixel constituting the fine line. However, the unit pattern includes also pixels (white pixel) in addition to the pixels constituting the fine line. Therefore, a correction is made on the measurement result using the ratio of the pixels of fine line in the unit pattern. Here, the density patch in the vertical fine line density patch group 201 uses a unit pattern in which the ratio of the pixels of fine line is 1/3. Therefore, by performing a correction by multiplying 3-fold the measurement result, the output density per pixel of fine line forming a vertical fine line can be calculated.

Likewise, the slant fine line density patch group 202 is density patches for measuring the output density when an input image data of a slant fine line is formed on a recording medium. The density patch is an image including a plurality of slant lines of 45°, which are disposed periodically to calculate the characteristic of the output density per pixel constituting one slant line of 45°. Here, a unit pattern of the density patch in the slant fine line patch group 202 includes 4 pixels×4 pixels. A diagonal line extending diagonally right-upward including four black pixels is an image of a slant fine line. The density patch includes four slant fine lines. The four slant fine lines are separated from each other at an extent that no influence is exerted on the respective densities.

In each of the density patches in the slant fine line density patch group 202, the slant fine line includes pixels of fine line having a tone of 33, 69, 102, 136, 172, 205, 238, 255. Similar to the vertical fine line, also in the measurement result of the slant fine line density patch, the result has to be corrected based on the ratio of the pixels of fine line in a unit pattern to associate with the input tone value. Each of the density patches of the slant fine line density patch group 202 uses a unit pattern in which the ratio of the pixels of fine line is 1/4. Therefore, the output density per pixel forming a slant fine line is calculated by performing a correction multiplying the measurement result by 4.

A distance that the density is not influenced each other, depends on the characteristic of the image recording section 106. It is possible to calculate the necessary distance between the dots based on experiments. The unit pattern may be determined based on the necessary distance between the dots. For example, when the necessary distance between the dots is three pixels, the unit pattern of the density patch of fine line is 10 pixels in vertical direction×4 pixels in horizontal direction. An image of vertical fine line including a black pixel at the left side may become the unit pattern.

(Gamma Correction Table Generation)

Figure 5B:
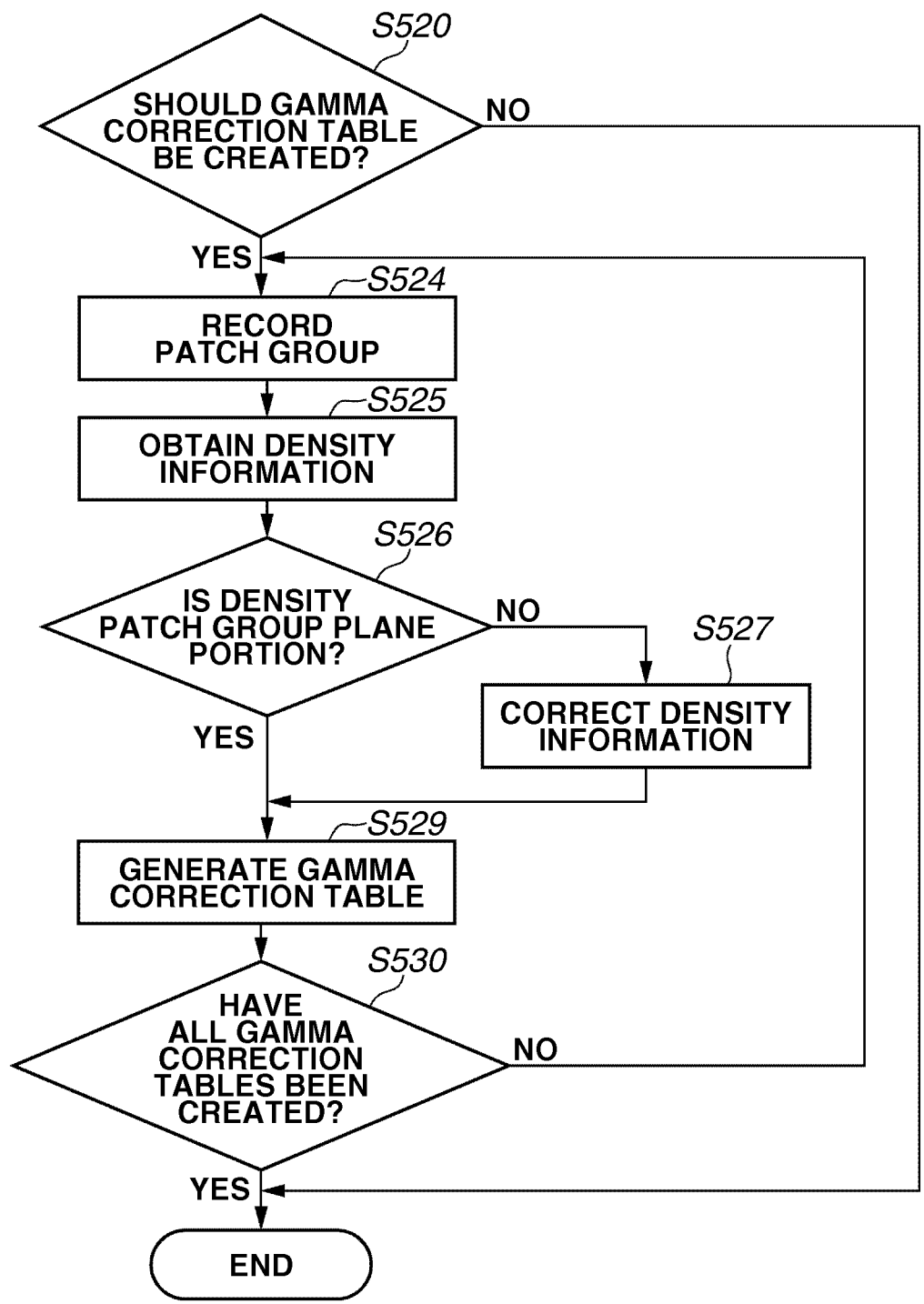

The operation of the image forming device according to the first exemplary embodiment for creating a gamma correction table will be described below. FIG. 5B is a flowchart for creating a gamma correction table.

In step S520, the image forming device 10 determines whether the gamma correction table should be generated. The gamma correction table may be generated simultaneously when a calibration is made on the image forming device 10. Also, the gamma correction table may be generated when an instruction is given from the CPU or a user; when the number of records exceeds a predetermined number; or when an environmental condition of the apparatus changes. The gamma correction table may be generated at any timing. When a gamma correction table is generated (YES in step S520), the process proceeds to step S524.

In step S524, the patch recording section 101 selects a predetermined density patch group to generate a gamma correction table. According to the first exemplary embodiment, the image processing section 105 uses three kinds of gamma correction tables; i.e., a gamma correction table for plane portion, a gamma correction table for vertical fine line, and a gamma correction table for slant fine line. Therefore, the patch recording section 101 selects anyone of the plane portion density patch group 200, the vertical fine line density patch group 201, and the slant fine line density patch group 202. The density patches illustrated in FIG. 2 are stored in a storage capacity such as a read-only memory (ROM) or a random access memory (RAM). According to the first exemplary embodiment, as a result of a low tone processing made by the low gradation processing section 1054, the number of density patches included in the plane portion density patch group 200 is smaller than a quasi available number of tones. This is because a number of measurement density patches is to be reduced.

In step S525, the density information obtaining section 102 obtains density information of each of the density patches recorded on the recording medium. According to the first exemplary embodiment, a measurement result of an output density of a density patch corresponding to each tone, which is measured using the density sensor, is obtained as density information. The density sensor has a measurement range illustrated in FIG. 3. When the plane portion density patch group 200 is selected, the measurement values in FIG. 3 are obtained as the density information. When the vertical fine line density patch group 201 or the slant fine line density patch group 202 is selected, eight measurement values corresponding to the target tone are obtained as the density information. According to the first exemplary embodiment, the resolution of the density sensor is lower than the resolution of the input image as described above. With this, an output density corresponding to a quasi tone expressed by a plurality of pixel groups can be measured. Also, when the tone is expressed in a pixel unit, the output density can be measured considering a bleeding of a dot (ink) or a dot gain on the recording medium.

In step S526, the process branches based on whether or not the selected density patch group is plane portion. When the dot pattern is a plane portion (YES in step S526), the process proceeds to step S529, and when the dot pattern is a fine line (NO in step S526), the process proceeds to step S527.

In step S527, when the selected density patch group is for vertical fine line or for slant fine line, the density information correction section 103 performs a correction on the density information obtained in step S525 to calculate a precise output density characteristic. In the case of the vertical fine line density patch 201 or the slant fine line density patch 202 illustrated in FIG. 2B, the output density in the measurement range tends to vary easily depending on the position of the measurement range.

However, when the measurement range of the density sensor is wider than the distance between the fine lines, or when a plurality of fine lines is included in a measurement range like the case of the first exemplary embodiment, the measurement result measured by the density sensor and the ratio of the pixels of fine lines included in the density patch are substantially identical to each other.

Here, the ratio of pixels of fine lines included in a density patch is defined as the ratio of the pixels of fine lines included in the unit patterns disposed in a repeated manner in the density patch. In the vertical fine line density patch group 201, the ratio of the pixels of fine lines is 1/3; and in the slant fine line patch group 202, the ratio of the pixels of fine lines is 1/4. As described above, by multiplying the density information corresponding to each input tone by an inverse number of the ratio of the pixels of fine lines, the output density corresponding to the input tone can be calculated more precisely.

Figure 10A:
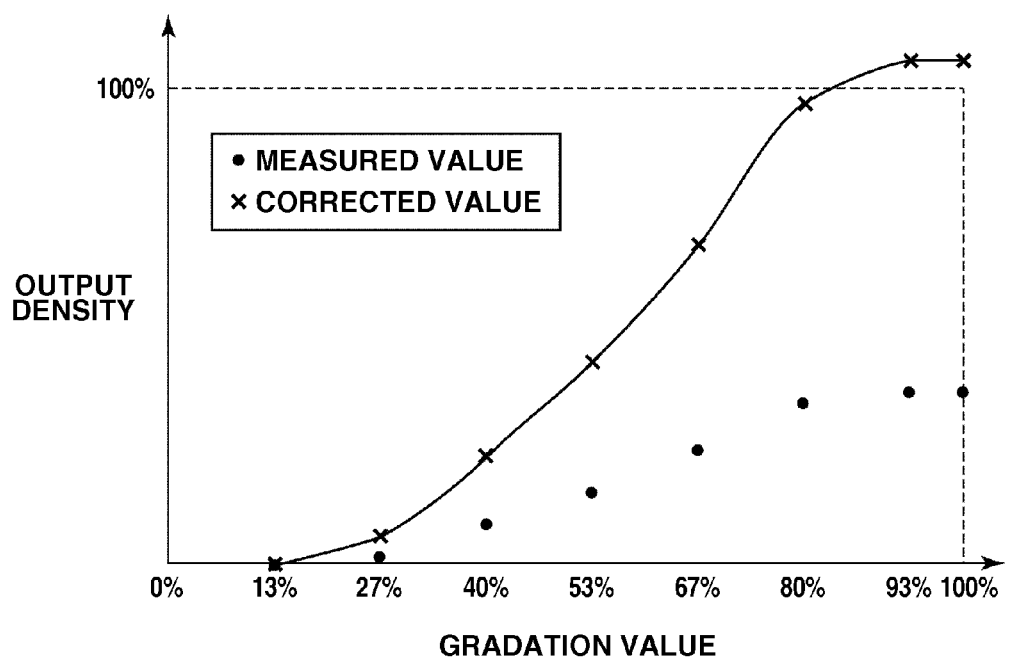
FIGS. 10A and 10B illustrate a generation of a gamma correction table.

FIG. 10A illustrates a measurement result of the vertical fine line density patch group 202. In the figure, a plot "●" represents a measurement value of the vertical fine line density patch group 201 measured by the sensor. The measurement value is held as density information. In step S527, when the density information correction section 103 performs a correction, a correction value indicated by a plot "x" is obtained. The correction value illustrated in FIG. 10A includes a region where the output density exceeds 100%. This is caused by a dot gain phenomenon on the recording medium in which dots are recorded in a range exceeding pixels of the input image data.

In step S529, the image forming device 10 calculates the characteristic of the output density based on the density information or the corrected density information to generate a gamma correction table. As an example, a case will be described where a vertical fine line gamma correction table is generated. In the case of the vertical fine line, a corrected value of the density information is the output density corresponding to each input tone value. Based on the obtained plurality of output densities, the output densities for the not-measured input tone values are interpolated. A solid line in FIG. 10A represents an interpolation result. The solid line in FIG. 10A represents the characteristic of the output density of the pixels constituting a vertical fine line.

Figure 10B:
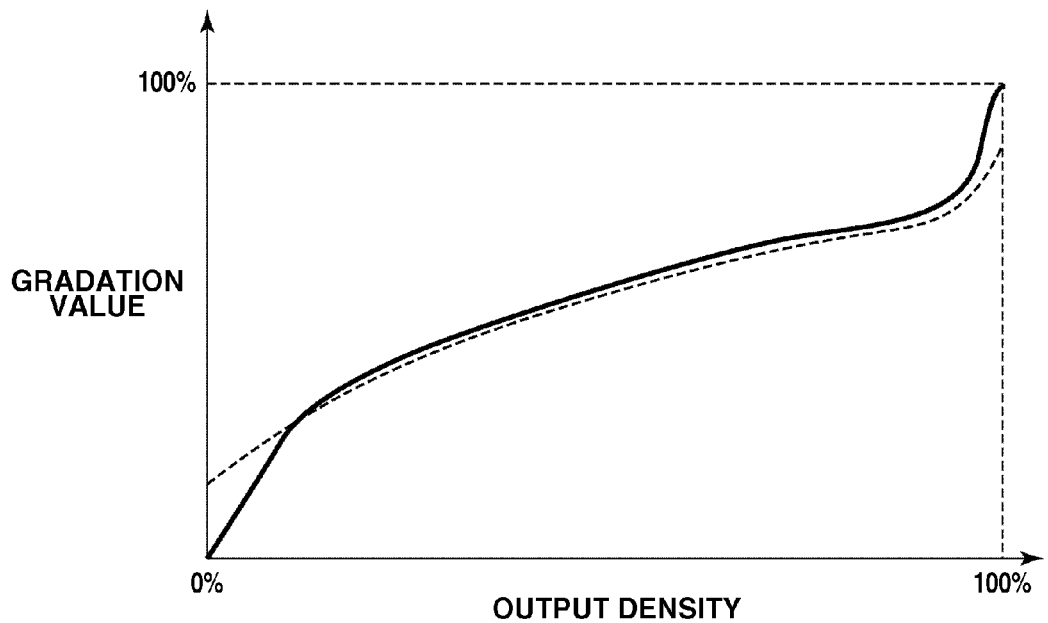

In contrast to the solid line in FIG. 10A, a broken line in FIG. 10B, which is obtained by exchanging the coordinate axes of the input tone value and the output density, is the gamma correction table. A gamma correction table like the solid line illustrated in FIG. 10B may be generated by correcting the correction table in a region where the reliability of the measurement value is low such as a low density region and a high density region.

In step S530, the image forming device 10 determines whether all gamma correction tables have been generated. According to the first exemplary embodiment, when the generation of any gamma correction table is not completed with respect to the plane portion, the vertical fine line, and the slant fine line (NO in step S530), the process proceeds to step S520 to generate another gamma correction table.

As described above, in the gamma correction table generation method according to the first exemplary embodiment, the correction is made on density information measured by the sensor to precisely calculate the output density corresponding to the input tone. With this, precise characteristic of the output density is obtained and an appropriate gamma correction table can be generated.

Also, in the density patch to be measured by the density sensor, a plurality of fine lines is disposed by repeating a unit pattern of a fine line. With this, even when the measurement position of the density sensor is displaced due to an attachment error or the like, the ratio of the dots included within the measurement range is constant. That is, by using a density patch in which a unit pattern is disposed in a repeated manner according the first exemplary embodiment, a measurement value which varies little with respect to a relative position between the sensor and the density patch can be obtained. In the density patch, the dots included in the unit pattern are separated from each other to an extent that the density is not influenced by the dots included in another unit patterns.

According to the first exemplary embodiment, as described above, even when the tone is represented in a pixel unit by correcting a measurement result, the output density per pixel which represents an input tone can be calculated. In particular, the measurement result is corrected based on a relationship between the pixel value of each pixel in a dot pattern and the tone represented by the dot pattern. As a result, according to the first exemplary embodiment, appropriate output density of an image of fine lines can be obtained, which is hard to measure when a conventional density sensor having a low resolution is used. The first exemplary embodiment eliminates an extra cost for adding a new sensor to generate a fine line gamma correction table.

A second exemplary embodiment will describe a generation of a gamma correction table for an isolated point. Different from the above-described first exemplary embodiment, an example will be described in which a gamma correction table is generated by using a high resolution density sensor having the resolution similar to that of an image data. A configuration similar to the configuration of the first exemplary embodiment is given with the same reference numeral and detailed description thereof will be omitted.

(Device Configuration)

According to the second exemplary embodiment, an image processing section 105 uses a gamma correction table for plane portion and a gamma correction table for isolated point. A gamma correction table generation section 104 generates two kinds of gamma correction tables for plane portion and for isolated point. In the case of plane portion, the dot pattern that a patch recording section 101 records for creating the gamma correction table is the plane portion density patch group 200 illustrated in FIG. 2A. On the other hand, an isolated-point density patch group 203 illustrated in FIG. 11 is used when creating a gamma correction table for isolated point.

Figure 12:
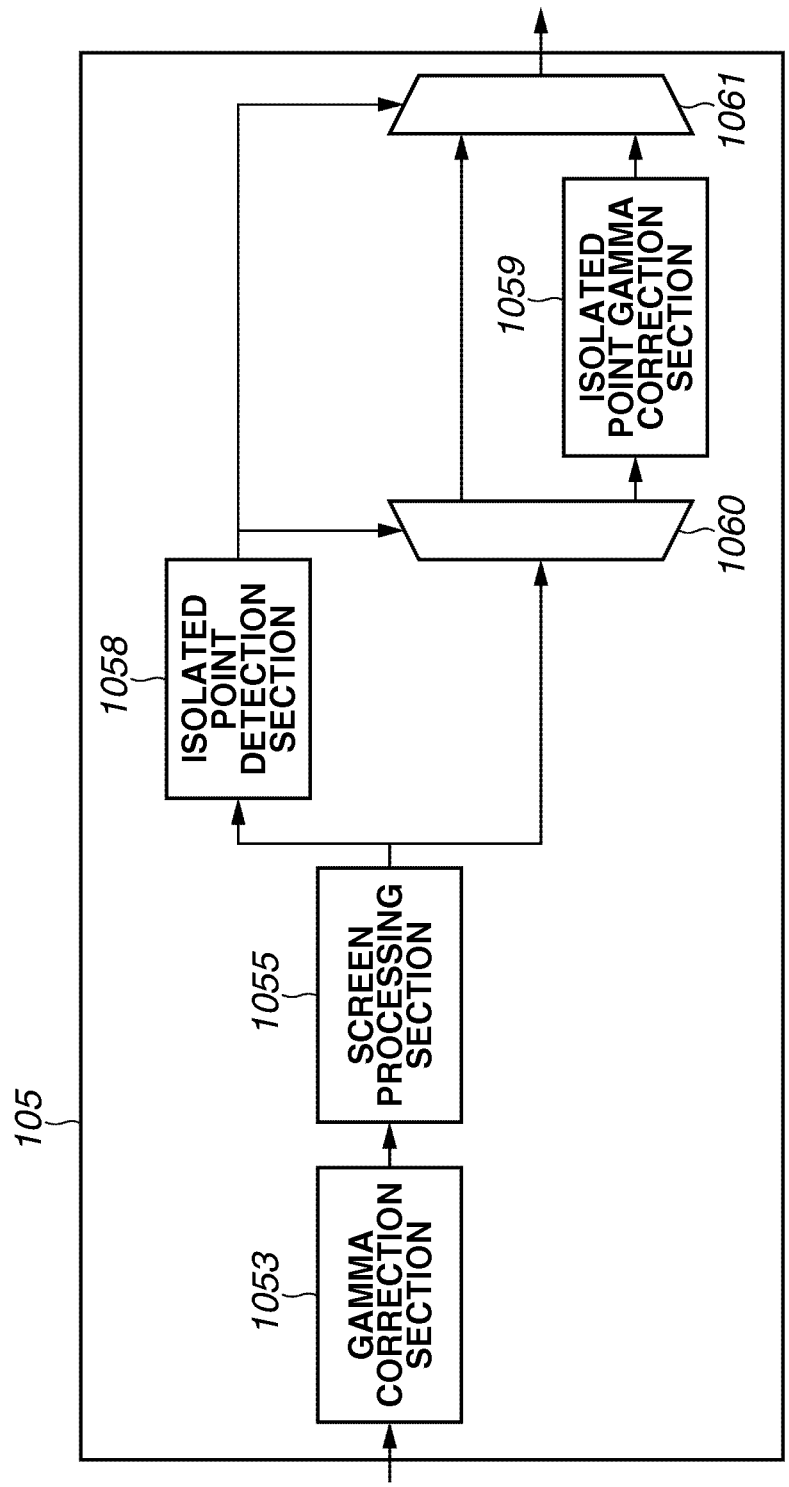
FIG. 12 is a block diagram illustrating a detailed image processing section.

FIG. 12 illustrates a detailed block diagram of an image processing section 105 applicable to the second exemplary embodiment. The image processing section 105 according to the second exemplary embodiment includes a gamma correction section 1053, a screen processing section 1055, an isolated point detection section 1058, an isolated point gamma correction section 1059, and selectors 1060 and 1061.

According to the second exemplary embodiment, the gamma correction section 1059 performs a gamma correction and the screen processing section 1055 performs screen processing on all pixels irrespective of characteristics of each pixel.

The isolated point detection section 1058 detects a pixel which is an isolated point based on the processing result of the screen processing section 1055.

The selector 1060 outputs information on each pixel to either the selector 1061 or the isolated point gamma correction section 1059 based on the determination result of the isolated point detection section 1058.

The isolated point gamma correction section 1059 further performs a gamma correction using an gamma correction table for isolated point, on the result processed by the screen processing section 1055 with respect to the pixel which is detected by the isolated point detection section 1058 as the isolated point.

The selector 1061 selects an value output from the isolated point gamma correction section 1059 for the pixel detected as the isolated point; and a value output from the screen processing section 1055 for the other pixels to output an output image data.

Figure 13A:
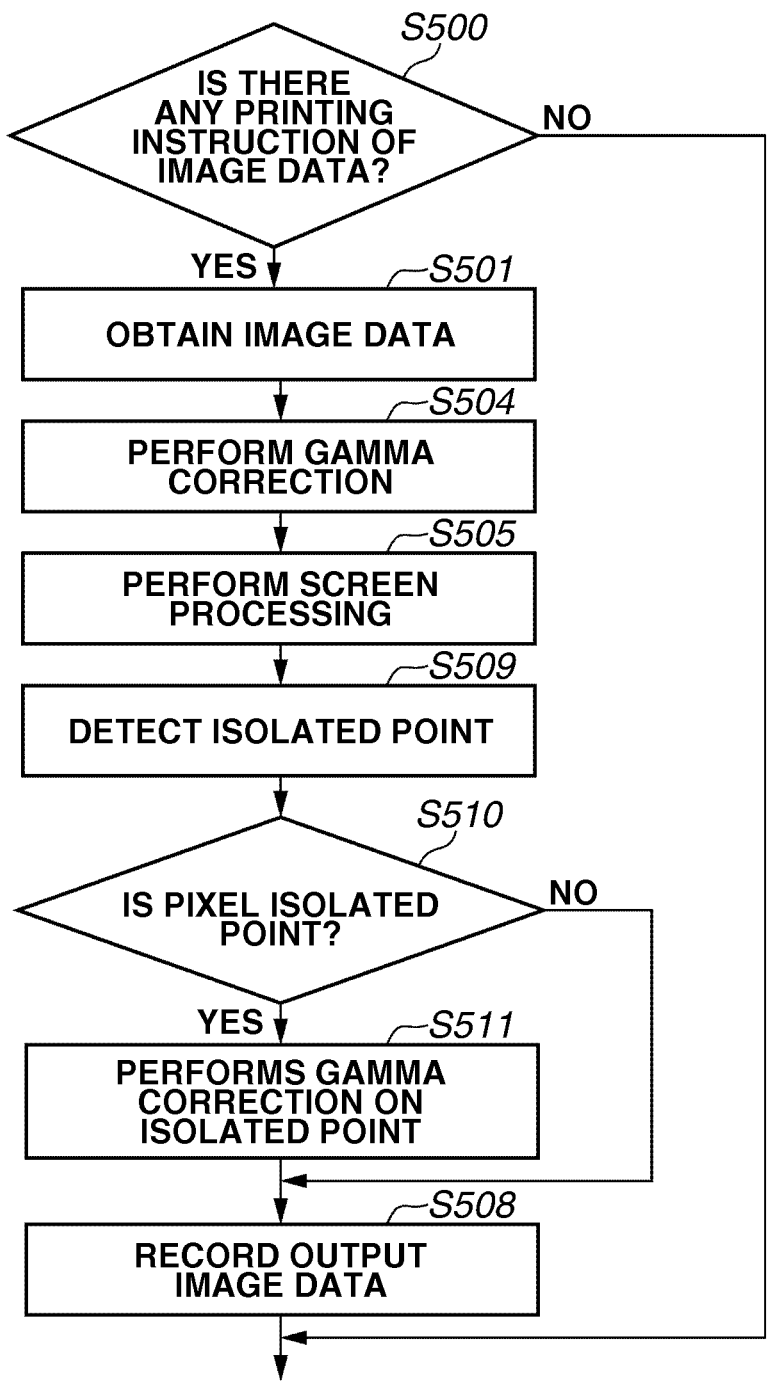
FIGS. 13A and 13B are flowcharts of an image recording operation and a gamma correction table creating operation.
Figure 13B:
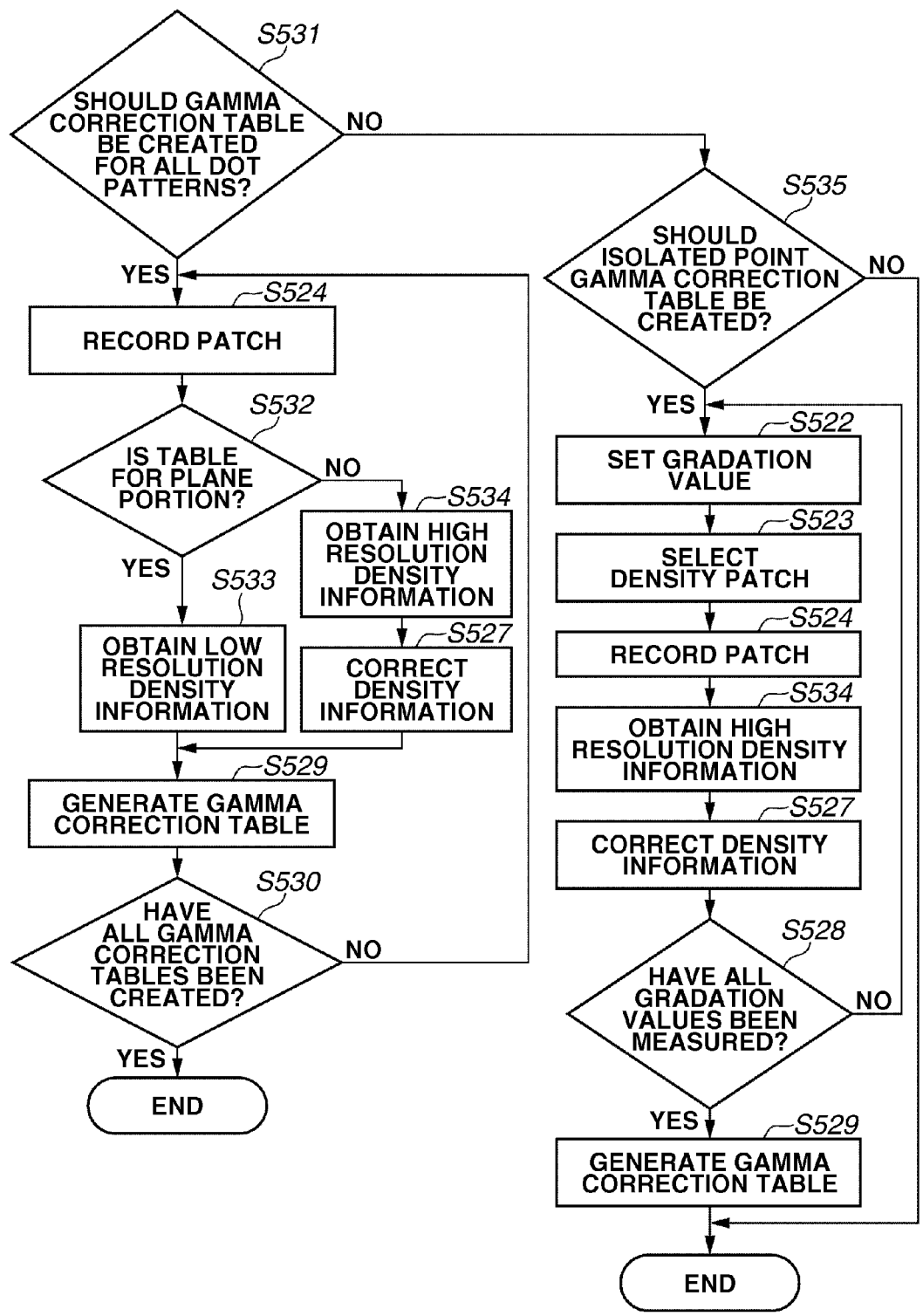

The image recording operation and the gamma correction table creating operation in the image forming device according to the second exemplary embodiment will be described below. FIG. 13A illustrates a flowchart of the image recording operation. FIG. 13B illustrates a flowchart of the gamma correction table creating operation.

(Image Recording Operation)

According to the second exemplary embodiment, when the image recording operation starts, input image data is obtained in step S501. In step S504, the gamma correction section 1053 performs a plane portion gamma correction on all pixels. In step S505, the screen processing section 1055 performs screen processing.

Figure 14:
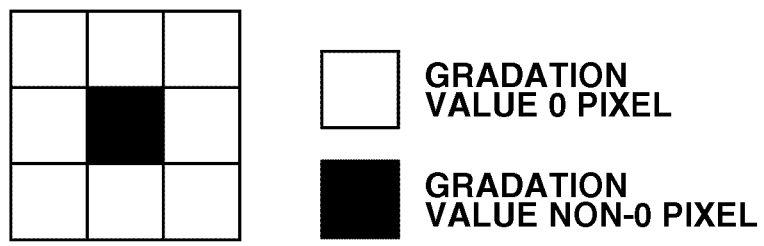
FIG. 14 illustrates an isolated point detection condition.

In step S509, the isolated point detection section 1058 detects an isolated point from the screen processing result. FIG. 14 illustrates conditions for detecting an isolated point. The isolated point obtained as a result of the screen processing is a pixel having an output value larger than 0, and the output values of the pixels around the isolated point are all 0.

In step S510, the process branches on each pixel based on the isolated point detection result in step S509. When the pixel to be processed is determined as an isolated point (YES in step S510), the process proceeds to step S511, and when the pixel to be processed is determined as not-isolated point (NO in step S510), the process proceeds to step S508.

In step S511, the isolated point gamma correction section 1059 performs an isolated point gamma correction on the pixel at the isolated point. The isolated point gamma correction section 1059 according to the second exemplary embodiment performs a gamma correction using a gamma correction table for isolated point. The pixel value of the pixel to be processed, which is input to the isolated point gamma correction section 1059, has been already subjected to the plane portion gamma correction by the gamma correction section 1053. The image data has been converted to match up with the output density of screen processing in the plane portion. Therefore, the gamma correction table for isolated point used here is generated to match up with the output density at the isolated point after cancelling the effect of the plane portion gamma correction.

In step S508, the output image data output from the selector 1061 is recorded. Generally, the formation of the isolated point tends to be unstable particularly when the image recording section 106 records the image on a recording medium using electro-photography. Therefore, as the processing flow described above illustrates, the gamma correction is made by detecting the isolated point from the result of the screen processing; thereby output density of the isolated point can be precisely adjusted.

(Isolated Point Density Patch)

FIG. 11 illustrates a density patch group to be recorded to generate a gamma correction table for isolated point. An isolated-point density patch group 203 according to the second exemplary embodiment has 3 pixels×3 pixels. Here, the measurement of the density patch at the isolated point is carried out using a high-resolution sensor. To measure the output density considering bleeding of ink and dot gain, it is desirable that the measurement is carried out including the pixel of the isolated point and eight pixels around the isolated point. Compared to the case of the density patch of the plane portion density patch group 200, in the case of the density patch of the isolated point, the time for creating the gamma correction table can be reduced by reducing a size of the patch group 200 to the minimum necessary for the measurement. For example, to generate a gamma correction table for isolated point, same as the first exemplary embodiment, it is assumed that density patches of 10 pixels×10 pixels for the tone number are sequentially detected with a low resolution sensor to obtain the density information. In the case that a high-resolution sensor is used according to the second exemplary embodiment, since the size of the density patch requires 3 pixels×3 pixels, the time required for recording the density patch is reduced to 3/10. Further, the area used for recording the patch is reduced to 9/100. The high-resolution sensor may include a plurality of density sensors so that entire area to be measured illustrated in FIG. 15 can be detected simultaneously. Alternatively, the density information of an entire area to be measured may be obtained by increasing the measurement times using fewer sensors than the number of points to be measured.

(Gamma Correction Table Generation)

According to the second exemplary embodiment, the gamma correction table to be generated includes two kinds; i.e., a gamma correction table for plane portion and a gamma correction table for isolated point. FIG. 13B illustrates a flowchart of processing for creating the gamma correction tables.

In step S531, the patch recording section 101 branches the process depending on whether the gamma correction table should be generated for all dot patterns. When a gamma correction table for entire dot pattern should be generated (YES in step S531), the process proceeds to step S5244, and the patch recording section 101 selects a plane portion density patch group 200 or the isolated-point density patch group 203 illustrated in FIG. 11. The patch recording section 101 records a density patch of the selected density patch group on the recording medium.

In step S532, the process branches depending on the generation of correction table for plane portion or for isolated point. When the gamma correction table to be generated is for plane portion (YES in step S532), the process proceeds to step S533; and when the gamma correction table to be generated is for isolated point (NO in step S532), the process proceeds to step S534.

In step S533, the density information of the density patch recorded in step S524 is obtained by a density information obtaining unit using a low resolution density sensor to generate a gamma correction table for plane portion. Same as the density information obtaining unit in step S525, which has been described in the first exemplary embodiment, this is a measurement result of the plane portion density illustrated in FIGS. 2A and 2B. The patch group 200 is measured by a low resolution density sensor which has a measurement range illustrated in FIG. 3.

Figure 15:
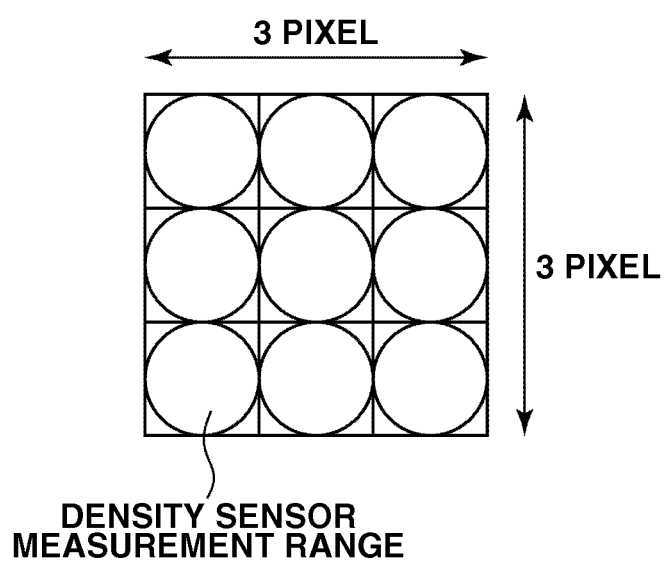
FIG. 15 illustrates a measurement range of a high-resolution sensor.

In step S534, to generate a gamma correction table for isolated point, the density patch recording an isolated point patch group illustrated in FIG. 11 is measured by a high resolution density sensor having a measurement range illustrated in FIG. 15. When measuring the density patch with the high resolution density sensor, since the measurement range is smaller than the pixel area of the image data, after obtaining measurement values corresponding to the pixels included in the density patch illustrated in FIG. 15, a plurality of measurement values are averaged to obtain the density information. This is because, in the case that the dot pattern is an isolated point, since the dot recorded on the recording medium also bleeds to the surrounding as described above, the density information of the pixels surrounding the isolated point is detected.

In step S527, the density information obtained in step S534 is corrected using the ratio of pixels constituting the isolated points in a dot pattern included in the measurement range. The measurement range by the high-resolution sensor illustrated in FIG. 15 is an area of 3 pixels×3 pixels. In the measurement range, the dot pattern of the isolated point is the only one pixel as illustrated in FIG. 11. The ratio of the dot pattern included in the range that obtains the density information is 1/9. By multiplying the inverse number of 1/9, the density information is corrected.

In step S529, a gamma correction table for each dot pattern is generated based on the input tone of the isolated point corresponding to the density information. The image processing section 105 according to the second exemplary embodiment performs a gamma correction for isolated point on the image data, which has been subjected to a gamma correction for plane portion. Therefore, a gamma correction table for isolated point is generated by combining a degamma correction table, which is generated by inversely converting a gamma correction table for plane portion to cancel a gamma correction for plane portion, and a correction table for performing a gamma correction for isolated point. In order to prevent a discontinuity of the density between the plane portion and the isolated point region, the output range is adjusted so that the value of the tone 100% of the combined correction table constantly remains 100%.

In step S530, the process returns to step S524 to repeat the above processing low until the gamma correction tables for the plane portion and for the isolated point have been generated.

When the processing flow for creating only a gamma correction table for isolated point is selected in step S535 (YES in step S535), the processing flow is similar to that of the above-described generation of the gamma correction table for isolated point.

In the description of an example made above, the processing flow chart for simultaneously creating a correction table for isolated point and a correction table for plane portion, and the processing flow chart for creating only a correction table for isolated point are carried out at a different timing. In the image forming device, the isolated point varies largely. Accordingly, with the configuration as described above, a gamma correction table for isolated point is generated more frequently than in a conventional generation of a gamma correction table. With this, a precise correction table matching up with the condition of the image forming device can be generated. Also, by using a high-resolution sensor for creating a correction table for isolated point, which is generated frequently, the time for creating a correction table and the area on a recording medium can be reduced.

A description will be made on a third exemplary embodiment of the gamma correction table generation method according to the invention below. According to the third exemplary embodiment, the accuracy of a gamma correction table for plane portion is increased by appropriately correcting a measurement result of a high-density patch for plane portion in a low density portion.

(Device Configuration)

Since the configuration of an image forming device according to the third exemplary embodiment is similar to the image forming device according to the first exemplary embodiment illustrated in FIG. 1, apart of description of image forming device according to the third exemplary embodiment will be omitted.

Figure 16:
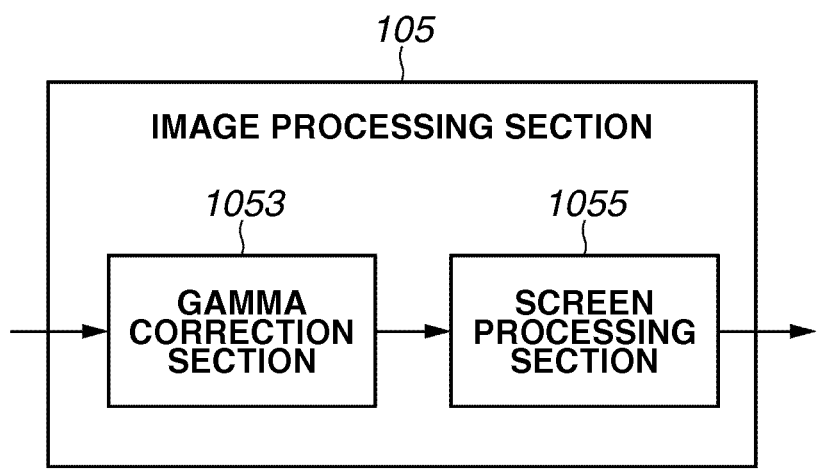
FIG. 16 is a block diagram illustrating a detailed image processing section.

FIG. 16 illustrates a detailed block diagram of an image processing section 105 according to the third exemplary embodiment. The image processing section 105 according to the third exemplary embodiment includes a gamma correction section 1053 and a screen processing section 1055.

The gamma correction section 1053 performs a gamma conversion of an image data based on a gamma correction table for plane portion.

The screen processing section 1055 performs screen processing illustrated in FIG. 8. As described above, a dot pattern, which is obtained by performing the screen processing, represents the tone in a unit cell of a plurality of pixels, in a quasi manner.

As described above, the image processing section 105 according to the third exemplary embodiment performs a gamma correction using only a single gamma correction table. The patch recording section records a density patch on a recording medium using a density patch group illustrated in FIG. 17 to measure the density. A gamma correction table generation section 104 generates a gamma correction table based on the measurement result. In the density patch group illustrated in FIG. 17, low density patches included in the plane portion density patch group 200 illustrated in FIG. 2A are replaced with a high-density patch group 1700. The low density patches here replaced with the high-density patch groups 1700 are dot patterns representing a tone 20 and a dot pattern representing a tone 38. Each of the high-density patches has a density patch in which the dot density is higher than the resolution of the corresponding low density patches illustrated in FIG. 2A.

The dot pattern representing a low density tone in the plane portion density patch group 200 illustrated in FIG. 2A has a small dot density. When the measurement range of the low resolution sensor illustrated in FIG. 3 is displaced, the number of the dots included in the measurement range changes and the measured density changes.

Therefore, a high-density patch having a high dot density is recorded on the recording medium. Even when the measurement position of the low resolution sensor is slightly displaced, almost the same number of dots is included in the measurement range. With this, measurement result, which is little influenced by a positional displacement of the density sensor, can be obtained.

The measurement result obtained by the density sensor includes sensor noises or noises due to a roughness of the base surface of the recording medium or unevenness of the density. Therefore, in a density patch corresponding to a low density tone, since the output density is small and the influences due to the noises relatively get larger, it may be hard to obtain an effective measurement value. According to the third exemplary embodiment, a high-density patch is used in a low density portion; thereby the influences due to the noises are relatively reduced. The measured result is corrected by the density information correction section 103. Thus, a high accurate gamma correction table can be generated.

The method for creating a high-density patch will be described in detail below. The dot patterns included in the plane portion density patch group 200 illustrated in FIG. 2A are formed based on the result of the screen processing illustrated in FIG. 8 on a plane image having a uniform tone. Therefore, in the density patch, the number and the appearance position of dots are identical in each of the cells.

Figure 18:
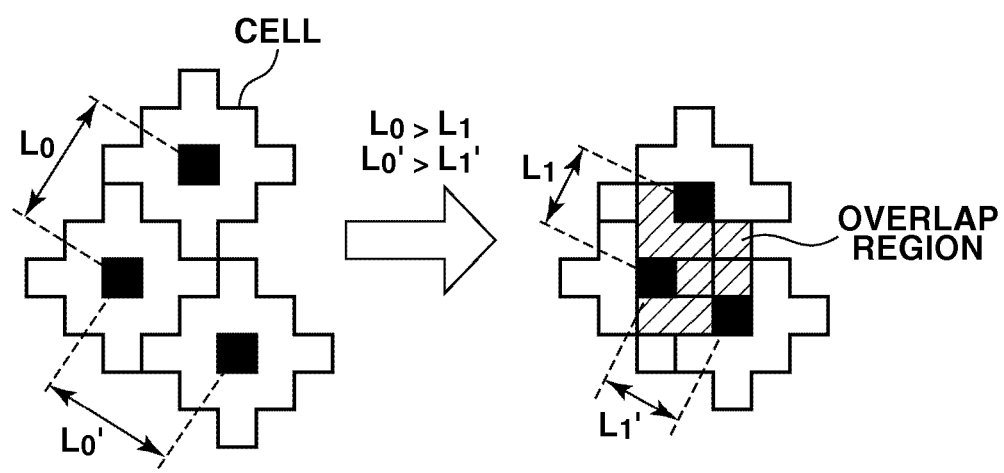
FIG. 18 illustrates a creating method of a high-density patch.

In the high-density patch group, dots are disposed with a higher density while maintaining the configuration of the dots in the low density dot pattern. In particular, as illustrated in FIG. 18, the distance $L_0$ and $L_0'$ between the dots in the adjacent cells is reduced to $L_1$ and $L_1'$; thus, a high-density patch group is generated. By reducing the distance among the dots, a part of the cells forming the dot pattern has a region overlapping with each other. Therefore, the ratio of the dots included in the density patch increases to be higher than the resolution of the original density patch.

The ratio of the dots included in the density patch can be calculated based on the ratio of the distance between the dots; i.e., $(L_0 \times L_0'/L_1 \times L_1')$. That is, the dot density in a high-density patch is $(L_0 \times L_0'/L_1 \times L_1')$ times the dot density in an ordinary density patch. For example, the dot density in a high-density patch corresponding to the tone 20 is approximately 2.6 times density patch corresponding to the tone 20; and approx. 1.6 times the density patch corresponding to the tone 38 illustrated in FIG. 2A.

However, when the distance between the dots is too close to each other in creating a high-density patch, the output density of the respective dots is influenced. In the high-density patch, the dots are separated from each other to an extent that the output density is not influenced. According to the third exemplary embodiment, the dot pattern of the high-density patch is generated with the dots separated from each other by 2 pixels or more. The distance between the disposed dots can be obtained based on an experimental result.

As described above, in the high-density patch, the cells as a unit dot pattern are periodically disposed and overlap with each other to increase the output density. Further, since the dots are separated from each other to an extent that no influence is exerted on each other, a desired output density of the density patch can be calculated by performing a correction.

Figure 19A:
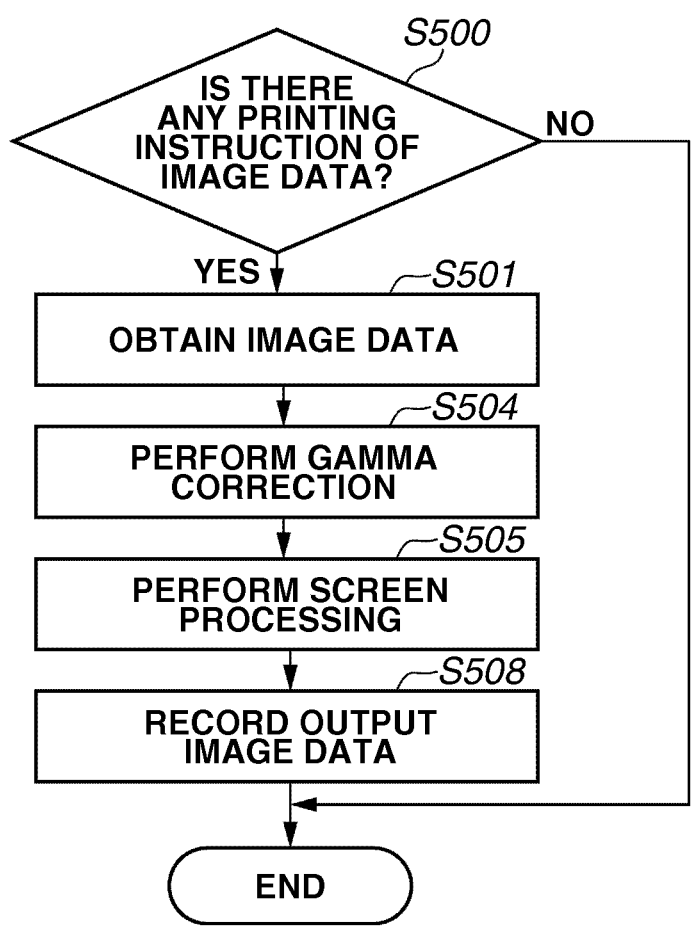
FIGS. 19A and 19B are flowcharts of an image recording operation and a gamma correction table creating operation.
Figure 19B:
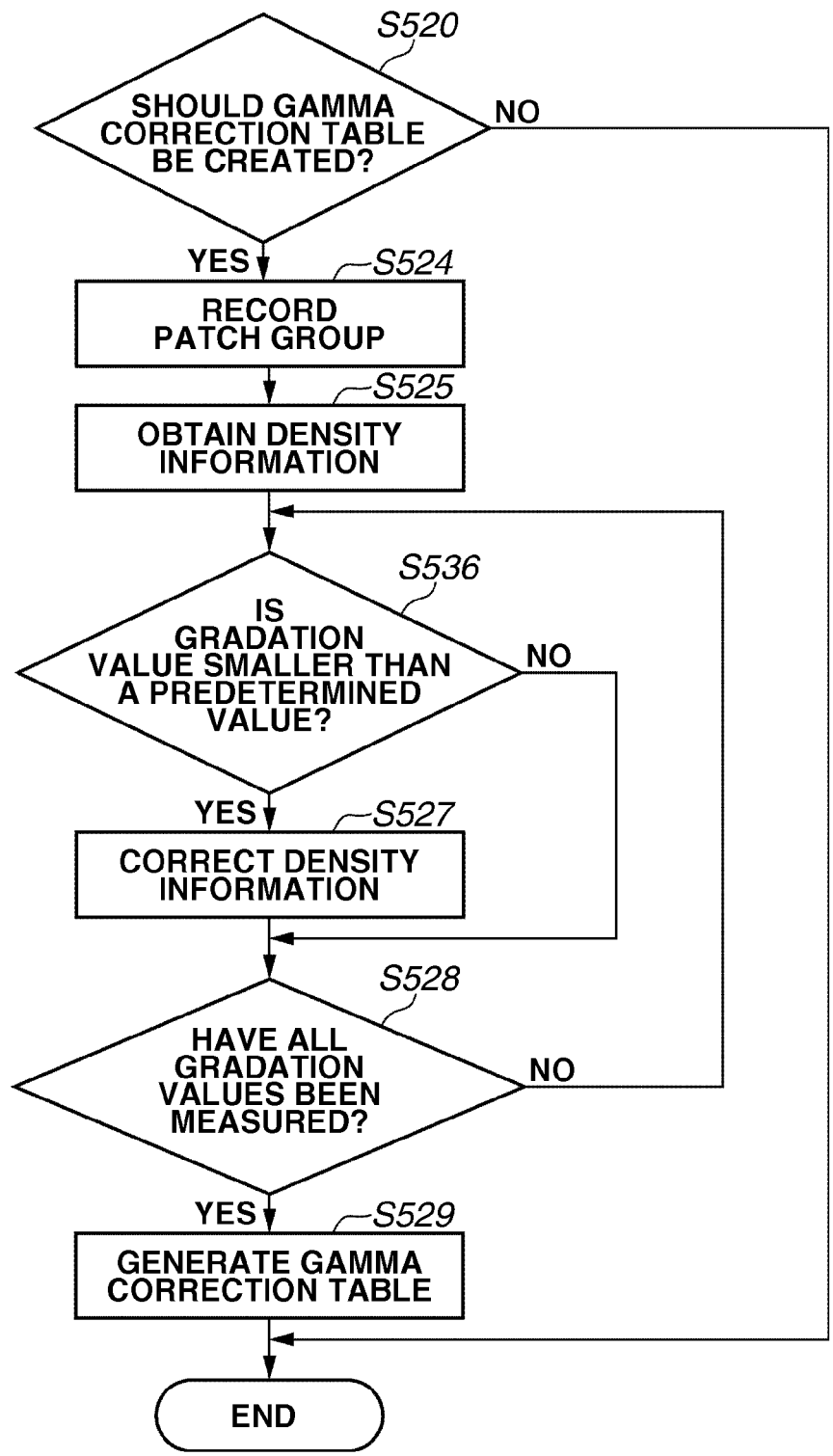

FIGS. 19A and 19B illustrate processing flowcharts in the image forming device according to the third exemplary embodiment. In the process illustrated in FIGS. 19A and 19B, since a process which has a the same name and reference numeral is a similar process as the process in the processing flowchart illustrated FIGS. 5A, 5B, 13A and 13B, the description thereof will be omitted.

(Image Recording Operation)

In the image recording operation according to the third exemplary embodiment, after obtaining an image data, the image data is subjected to a gamma correction and a screen processing and hen record. The description of each stage will be omitted.

(Gamma Correction Generation Operation)

Referring to a processing flowchart illustrated in FIG. 19B, a gamma correction table creating operation according to the third exemplary embodiment will be described below.

In step S520, a generation of a gamma correction table starts.

Figure 17:
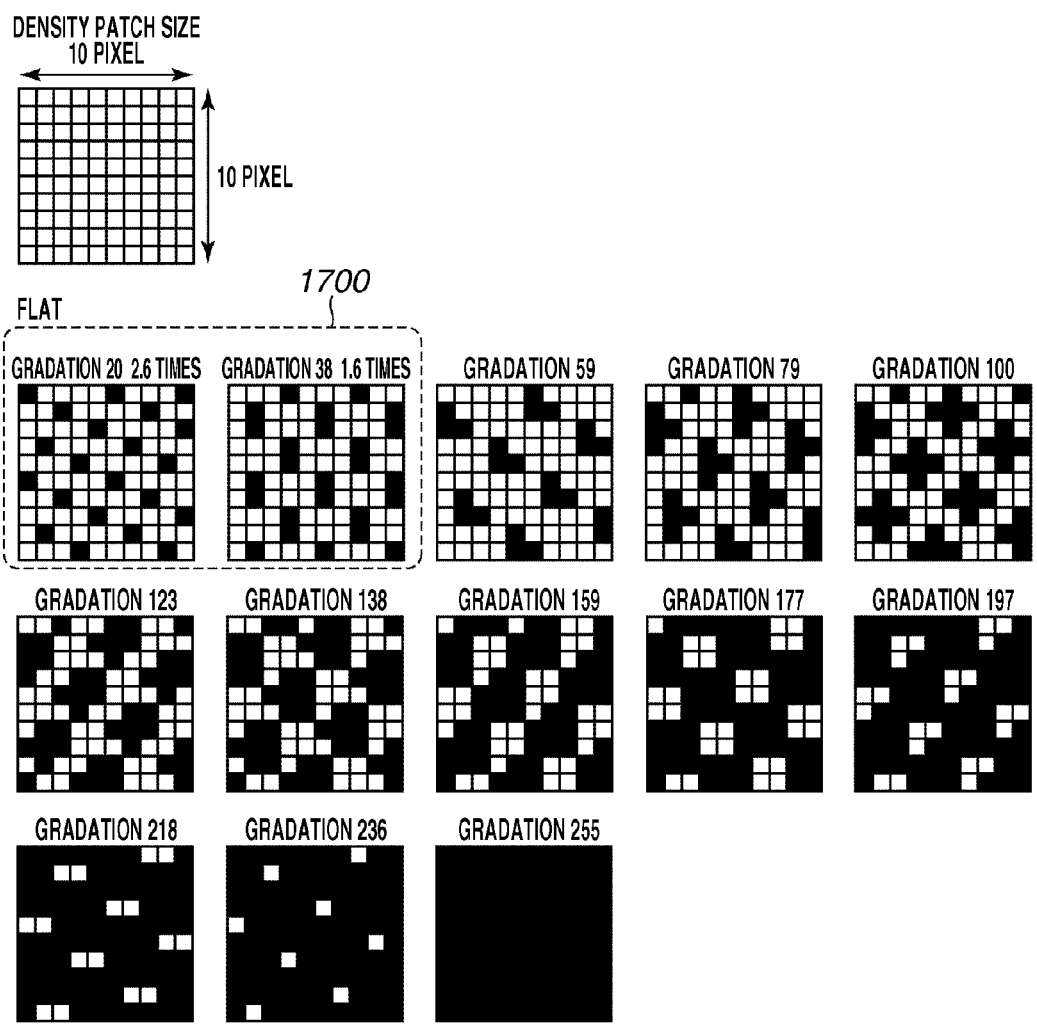
FIG. 17 illustrates an example of density patches.

In step S524, a patch recording section 101 selects a density patch group and records the density patch on a recording medium. According to the third exemplary embodiment, a density patch group illustrated in FIG. 17 is selected. Density patches 1700 corresponding to a low density tone are high-density patches in which dots are disposed at a high density. In step S525, a density information obtaining section 102 obtains a density patch recorded on the recording medium as density information based on a measurement result measured by a density sensor. According to the third exemplary embodiment, a density sensor having a measurement range illustrated in FIG. 3 is used. Here, 13 pieces of density information corresponding to different tones are obtained.

In step S536, the density information correction section 103 determines whether the density information should be corrected on each obtained density information. The determination is made based on the tone value corresponding to the density information to be processed; i.e., whether the value is equal to or smaller than a predetermined value. Here, the predetermined value means a tone value corresponding to a previously generated high-density patch.

In step S527, the density information correction section 103 corrects density information, the tone value of which is determined to be equal to or smaller than the predetermined value in step S536 (YES in step S536); i.e., corrects the density information obtained by measuring a high-density patch. In the case of the high-density patch group 1700, the dots are disposed at a density higher than the resolution of a desired dot pattern to be measured. The desired dot pattern to be measured means a dot pattern obtained through a screen processing made by the screen processing section 1055. Therefore, it is necessary to correct the obtained density information.

As described above, the dot density in the high-density patch corresponding to the tone 20 is approximately 2.6 times, and approximately 1.6 times the density patch corresponding to the tone 38 illustrated in FIG. 2A. Also, each of high-density patches does not influence the output density of the respective dots.

Figure 20A:
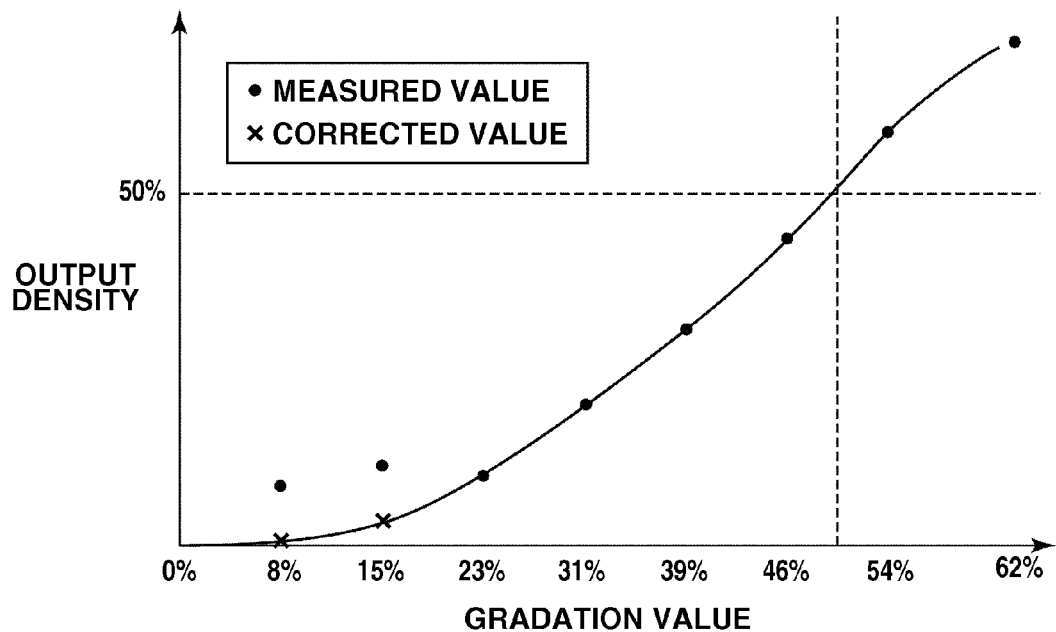
FIGS. 20A and 20B illustrate a generation of a gamma correction table.

As for the density information corresponding to the tone 20, the output density to be obtained can be calculated by multiplying the density information by an inverse number of 2.6. As for the density information corresponding to the tone 38, the output density to be obtained can be calculated by multiplying the density information by an inverse number of 1.6. FIG. 20A illustrates a measurement value for each tone value obtained by the density information obtaining section 102 and a correction value obtained by the density information correction section 103.

Figure 20B:
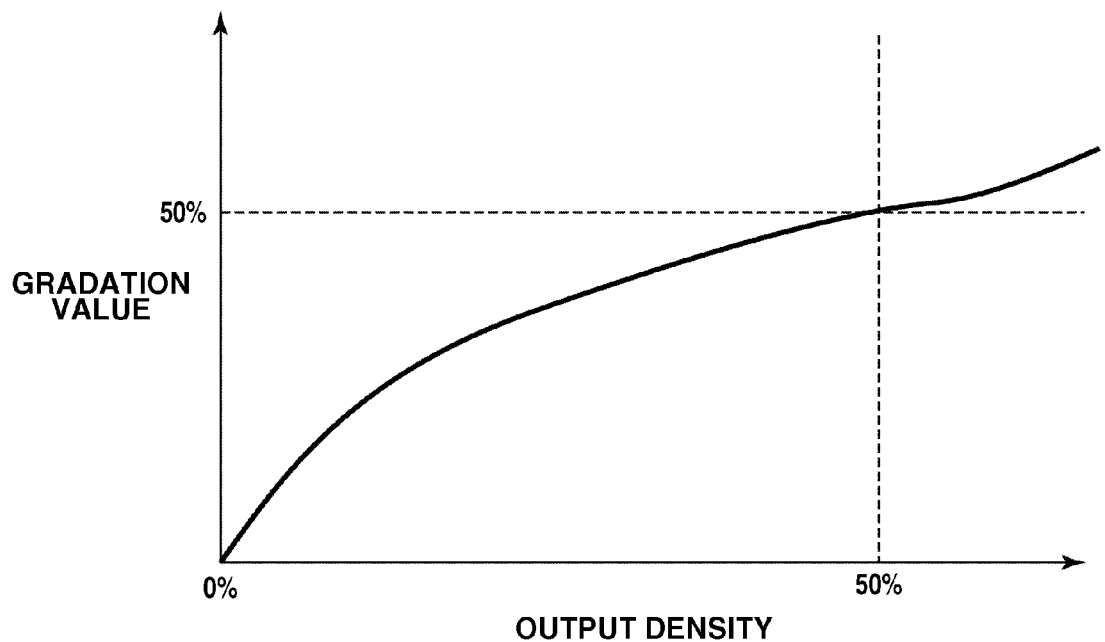

When the measurement for each tone is completed in step S528 (YES in step S528), the gamma correction table generation section 104 generates a gamma correction table in step S529. A solid line illustrated in FIG. 20A represents a characteristic of the output density obtained based on the measurement value and the correction value. As for the tone of the output density which is not measured, a curve is obtained by performing an interpolation. By performing an inverse conversion on the characteristic of the output density, an appropriate gamma correction table can be generated. FIG. 20B illustrates a gamma correction table generated according to the third exemplary embodiment.

In the third exemplary embodiment, a creating method of a gamma correction table has been described which can enhance the accuracy in a low density portion in the gamma correction table by correcting the density information based on the ratio of the dot pattern in a range for obtaining the density information.

In the third exemplary embodiment, an example of a dot concentrated type screen processing has been described. However, a similar effect can be also obtained through a dot dispersion type screen processing.

In the above-described exemplary embodiments, the patch recording section 101 is provided separate from the image recording section 106. However, when the density patch on a recording medium is measured, the image forming device may be configured such that the image recording section 106 records a density patch.

The present disclosure can be achieved by supplying a storage medium storing computer program code of software that executes the functions described in the above exemplary embodiments, to a system or an apparatus. In this case, the functions described in the above exemplary embodiments are achieved by a computer (CPU, micro processing unit (MPU), or the like) in the system or apparatus that reads out the computer program code stored in a computer readable storage medium.

According to the disclosure, the output density on a recording medium is measured by a sensor, and the measurement result is appropriately corrected; thereby an accurate gamma correction table is generated.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a CPU, MPU, or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2012-261311 filed Nov. 29, 2012, which is hereby incorporated by reference herein in its entirety.

What is claimed is:

1. A gamma correction table generation method of measuring a density patch output by an image forming device based on a dot pattern expressing a pseudo tone according to a number of black pixels included in each cell composed of a plurality of pixels, the gamma correction table generation method including steps of:
   obtaining density information by reading, with a reading sensor in a range wider than a cell, a plurality of density patches each corresponding to a tone,
   wherein the density patches each includes a plurality of cells,
   wherein the cells included in the density patches each includes a number of black pixels according to a corresponding tone,
   wherein the black pixels in each of the cells are arranged at same positions in each of the cells and the plurality of cells is periodically arranged,
   wherein in a case where a density patch of the plurality of density patches corresponds to a predetermined tone or more, the density patch is an image of a dot pattern in which the plurality of cells is arranged such that pixels included in the cells do not overlap pixels included in adjacent cells and a distance between dots formed by the black pixels included in the cells is a predetermined distance, and
   wherein in a case where a density patch of the plurality of density patches corresponds to less than a predetermined tone, the density patch is an image of a dot pattern in which a plurality of cells is arranged such that some pixels included in a cell overlap some pixels in an adjacent cell so that the black pixels included in each of the cells are separated from the black pixels in adjacent cells to an extent that a shape of a dot formed by the black pixels included in each of the cells is maintained and such that a distance between dots in the cells is a distance shorter than the predetermined distance;
   correcting density information being obtained by measuring the density patch corresponding to less than a predetermined tone, in the density information according to a number of the cells in the density patch; and
   generating a gamma correction table based on density information on the density patch corresponding to the predetermined tone or more and the corrected density information.

2. The gamma correction table generation method according to claim 1, wherein in the correcting step, the density information is corrected based on the number of cells in a case where the cells are disposed at the predetermined distance and a number of cells in a case where the cells are disposed at the distance shorter than the predetermined distance with each other in a range of the density patch.

3. The gamma correction table generation method according to claim 1, wherein
   in the correcting step, only the density information corresponding to the density patch in the case where the number of black pixels included in the cell is less than a predetermined number is corrected; and
   in the generating step, the gamma correction table is generated based on the density information and a result of the correcting step.

4. The gamma correction table generation method according to claim 1, wherein the reading sensor has a resolution level lower than a resolution of image data.

5. The gamma correction table generation method according to claim 1, wherein the cells correspond to a threshold matrix used in a screen processing for generating image data to be output from the image forming device.

6. The gamma correction table generation method according to claim 1, wherein timing of creating the gamma correction table is arbitrarily set.

7. The gamma correction table generation method according to claim 1,
   wherein the plurality of cells each includes at least one black pixel forming one dot and white pixels surrounding the dot, and
   wherein some of the white pixels included in one cell overlap with some of the white pixels included in an adjacent cell such that the dot is not adjacent to a dot included in the adjacent cell.

8. An image processing device, wherein a gamma correction table is generated by a gamma correction table generation method of measuring a density patch output by an image forming device based on a dot pattern expressing a pseudo tone according to a number of black pixels included in each cell composed of a plurality of pixels, the gamma correction table generation method including steps of:
   obtaining density information by reading, with a reading sensor in a range wider than a cell, a plurality of density patches each corresponding to a tone,
   wherein the density patches each includes a plurality of cells,
   wherein the cells included in the density patches each includes a number of black pixels according to a corresponding tone,
   wherein the black pixels in each of the cells are arranged at same positions in each of the cells and the plurality of cells is periodically arranged,
   wherein in a case where a density patch of the plurality of density patches corresponds to a predetermined tone or more, the density patch is an image of a dot pattern in which the plurality of cells is arranged such that pixels included in the cells do not overlap pixels included in adjacent cells and a distance between dots formed by the black pixels included in the cells is a predetermined distance, and wherein in a case where a density patch of the plurality of density patches corresponds to less than a predetermined tone, the density patch is an image of a dot pattern in which a plurality of cells is arranged such that some pixels included in a cell overlap some pixels in an adjacent cell so that the black pixels included in each of the cells are separated from the black pixels in adjacent cells to an extent that a shape of a dot formed by the black pixels included in each of the cells is maintained and such that a distance between dots in the cells is a distance shorter than the predetermined distance;

correcting density information being obtained by measuring the density patch corresponding to less than a predetermined tone, in the density information according to a number of the cells in the density patch; and generating a gamma correction table based on density information on the density patch corresponding to the predetermined tone or more and the corrected density information.

9. An image processing device comprising a correction unit that performs gamma correction on image data using a gamma correction table generated by the gamma correction table generation method according to claim 1.

10. The image processing device according to claim 9, further comprising a screen processing unit that performs screen processing using a threshold matrix on input image data, wherein
the correction unit performs a gamma correction on the image data screen-processed by the screen processing unit using the gamma correction table.

11. A non-transitory computer readable recording medium storing a computer program that causes a computer to read and execute the program to function as an image processing device, wherein a gamma correction table is generated by a gamma correction table generation method of measuring a density patch output by an image forming device based on a dot pattern expressing a pseudo tone according to a number of black pixels included in each cell composed of a plurality of pixels, the gamma correction table generation method including steps of:

obtaining density information by reading, with a reading sensor in a range wider than a cell, a plurality of density patches each corresponding to a tone, wherein the density patches each includes a plurality of cells, wherein the cells included in the density patches each includes a number of black pixels according to a corresponding tone, wherein the black pixels in each of the cells are arranged at same positions in each of the cells and the plurality of cells is periodically arranged, wherein in a case where a density patch of the plurality of density patches corresponds to a predetermined tone or more, the density patch is an image of a dot pattern in which the plurality of cells is arranged such that pixels included in the cells do not overlap pixels included in adjacent cells and a distance between dots formed by the black pixels included in the cells is a predetermined distance, and wherein in a case where a density patch of the plurality of density patches corresponds to less than a predetermined tone, the density patch is an image of a dot pattern in which a plurality of cells is arranged such that some pixels included in a cell overlap some pixels in an adjacent cell so that the black pixels included in each of the cells are separated from the black pixels in adjacent cells to an extent that a shape of a dot formed by the black pixels included in each of the cells is maintained and such that a distance between dots in the cells is a distance shorter than the predetermined distance;

correcting density information being obtained by measuring the density patch corresponding to less than a predetermined tone, in the density information according to a number of the cells in the density patch; and generating a gamma correction table based on density information on the density patch corresponding to the predetermined tone or more and the corrected density information.

12. A gamma correction table generation method for an image forming device to output image data, wherein the image data is data on which dot-concentrated-type screen processing is performed, and wherein the screen processing is processing for generating halftone image data expressing a pseudo tone according to a number of black cells in each cell composed of a plurality of pixels, the gamma correction table generation method comprising:

obtaining density information by reading, with a reading sensor in a range wider than a cell, a density patch, wherein the density patch includes a plurality of cells, wherein the plurality of cells each includes one dot composed of at least one black pixel and includes a number of dots equal to a number of black cells according to a target tone, and the black pixels in each cell are arranged at same positions, and wherein the density patch is an image in which the plurality of cells is arranged such that the cells partially overlap with each other to an extent that a shape of the dots is maintained, and a number of cells included in the density patch is larger than a case where the cells are disposed such that the cells do not overlap with each other;

correcting the obtained density information based on a number of cells included in the density patch; and generating a gamma correction table based on the corrected density information.

* * * * *